United States Patent
Curtis et al.

(10) Patent No.: US 12,511,281 B1
(45) Date of Patent: Dec. 30, 2025

(54) AUTOMATED TRANSFORMATION OF NATURAL LANGUAGE QUERIES INTO SEARCH QUERY STATEMENTS USING ARTIFICIAL INTELLIGENCE

(71) Applicant: Splunk Inc., San Francisco, CA (US)

(72) Inventors: Kristal Curtis, San Francisco, CA (US); Abraham Starosta, Miami, FL (US); Julien Didier Jean Veron Vialard, Stanford, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/124,550

(22) Filed: Mar. 21, 2023

Related U.S. Application Data

(60) Provisional application No. 63/347,648, filed on Jun. 1, 2022, provisional application No. 63/322,202, filed on Mar. 21, 2022.

(51) Int. Cl.
  *G06F 16/242* (2019.01)
  *G06F 16/2452* (2019.01)

(52) U.S. Cl.
  CPC .... *G06F 16/2423* (2019.01); *G06F 16/24522* (2019.01)

(58) Field of Classification Search
  CPC .................. G06F 16/2423; G06F 16/24522
  See application file for complete search history.

(56) References Cited

U.S. PATENT DOCUMENTS

| | | |
|---|---|---|
| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |
| 9,286,413 B1 | 3/2016 | Coates et al. |
| 10,127,258 B2 | 11/2018 | Lamas et al. |

(Continued)

OTHER PUBLICATIONS

Baski, DBPal: A Learned NL-Interface for Databases, pp. 1765-1768 (Year: 2018).*

(Continued)

*Primary Examiner* — Albert M Phillips, III
(74) *Attorney, Agent, or Firm* — Rutan & Tucker, LLP; Kyle M. St. James

(57) ABSTRACT

Implementations of this disclosure provide a search query statement generation system that receives user input being a natural language description of a search query and, through the use of artificial intelligence, translates the natural language description into an executable search query statement. The executable search query statement may be in the form of a pipelined search query statement. The use of artificial intelligence may include a trained machine learning model that transforms the natural language description to an alternative text format. In some instances, the trained machine learning model is a generative pre-trained transformer. In such instances, the natural language description may be provided to a chatbox, which may return one or more search query statements automatically generated by the generative pre-trained transformer. Further, one of the automatically generated search query statements may be executed such that the results are displayed within the chatbox.

18 Claims, 16 Drawing Sheets

(56) References Cited

U.S. PATENT DOCUMENTS

| | | | |
|---|---|---|---|
| 10,318,586 B1* | 6/2019 | Rose | G06F 16/285 |
| 2017/0116260 A1* | 4/2017 | Chattopadhyay | G06F 16/24522 |
| 2019/0098106 A1 | 3/2019 | Mungel et al. | |
| 2020/0097247 A1* | 3/2020 | Molina | G06F 3/0484 |

OTHER PUBLICATIONS

Jose, mRAT-SQL+GAP: A Portuguese Text-to-SQL Transformer, pp. 1-16 (Year: 2021).*

Anon., "https://en.wikipedia.org/wiki/GPT-2" dated Feb. 14, 2019, last accessed Apr. 14, 2023.

Anon., "https://en.wikipedia.org/wiki/GPT-3" dated Jun. 11, 2020, last accessed Apr. 14, 2023.

Anon., "https://github.com/salesforce/WikiSQL" last accessed Apr. 14, 2023.

Anon., "https://github.com/salesforce/WikiSQL#leaderboard" last accessed Apr. 14, 2023.

Anon., "https://github.com/taoyds/test-suite-sql-eval" last accessed Apr. 14, 2023.

Anon., "https://huggingface.co/EleutherAI/gpt-neo-1.3B" last accessed Apr. 14, 2023.

Anon., "https://learn.microsoft.com/en-us/power-apps/maker/canvas-apps/power-apps-ideas" dated Dec. 15, 2022, last accessed Apr. 14, 2023.

Anon., "https://openai.com/research/gpt-2-1-5b-release" dated Nov. 5, 2019, last accessed Apr. 14, 2023.

Anon., "https://pile.eleuther.ai/" last accessed Apr. 14, 2023.

Anon., "https://unifiedskg.com/benchmarks/#semantic-parsing" dated May 16, 2022, last accessed Apr. 14, 2023.

Anon., "https://www.deepmind.com/blog/competitive-programming-with-alphacode" dated Dec. 8, 2022, last accessed Apr. 14, 2023.

Anon., "https://yale-lily.github.io/spider" last accessed Apr. 14, 2023.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Brown, T., et al. "Language Models are Few-Shot Learners", https://arxiv.org/pdf/2005.14165.pdf, dated Jul. 22, 2020.

Carraso, David, "Exploring Splunk," published by CITO Research, New York, NY, Apr. 2012.

Dunlap, L., et al., "https://www.nvidia.com/en-us/on-demand/session/gtcspring21-s33094/" dated Apr. 2021, last accessed Apr. 14, 2023.

Eduardo Muñoz, "https://towardsdatascience.com/attention-is-all-you-need-discovering-the-transformer-paper-73e5ff5e0634" Nov. 2, 2020, last accessed Apr. 14, 2023.

Raffel, C. et al., "https://huggingface.co/t5-small" dated Oct. 22, 2021, last accessed Apr. 14, 2023.

Roberts, A., "https://ai.googleblog.com/2020/02/exploring-transfer-learning-with-t5.html" dated Feb. 24, 2020, last accessed Apr. 14, 2023.

Scholak, T., "PICARD: Parsing Incrementally for Constrained Auto-Regressive Decoding from Language Models," https://arxiv.org/pdf/2109.05093.pdf, dated Sep. 2021, last accessed Apr. 14, 2023.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Splunk, Inc.., "https://docs.splunk.com/Documentation/SplunkCloud/8.2.2112/Search/GetstartedwithSearch" dated May 5, 2021, last accessed Apr. 14, 2023.

Splunk, Inc.., "https://docs.splunk.com/DocumentationStatic/PythonSDK/1.1/client.html" dated 2013, last accessed Apr. 14, 2023.

Splunk, Inc.., "https://www.nvidia.com/en-us/on-demand/session/gtcspring21-s33095/" dated Apr. 2021 last accessed Apr. 14, 2023.

Starosta, A.., "https://www.splunk.com/en_us/blog/it/how-splunk-is-parsing-machine-logs-with-machine-learning-on-nvidia-s-triton-and-morpheus.html" dated Apr. 15, 2021, last accessed Apr. 14, 2023.

Tao Yu et al., "https://arxiv.org/abs/1809.08887" dated Sep. 24, 2018, last accessed Apr. 14, 2023.

Tao Yu, "https://medium.com/@tao.yu/spider-one-more-step-towards-natural-language-interfaces-to-databases-62298dc6df3c" dated Sep. 25, 2018, last accessed Apr. 14, 2023.

Thomas Dohmke., "https://github.blog/2022-06-21-github-copilot-is-generally-available-to-all-developers/" dated Jun. 21, 2022, last accessed Apr. 14, 2023.

Vaswani, A., et al., "Attention Is All You Need" 31st Conference on Neural Information Processing Systems (NIPS 2017), Long Beach, CA, USA. dated Dec. 6, 2017, https://arxiv.org/pdf/1706.03762.pdf.

Vialard, J. V. et al., "https://www.nvidia.com/en-us/on-demand/session/gtcspring22-s41688/" dated Mar. 2022, last accessed Apr. 14, 2023.

Wang, Y., "https://huggingface.co/Salesforce/codet5-small" dated Oct. 18, 2021, last accessed Apr. 14, 2023.

Lily Liu, "Behind the Scenes—What it Takes to Teach GPT-3 How to Build Low-Code Apps"—https://powerapps.microsoft.com/en-us/blog/behind-the-scenes-what-it-takes-to-teach-gpt-3-how-to-build-low-code-apps/, dated Mar. 3, 2022.

* cited by examiner

AUTOMATED TRANSFORMATION OF NATURAL LANGUAGE QUERIES INTO SEARCH QUERY STATEMENTS USING ARTIFICIAL INTELLIGENCE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

In today's technology-focused society, the ability to store, process, retrieve or analyze digital data seemingly becomes more important each day. However, often times performing such operations requires a user to write computer software code, which inherently requires some knowledge of a programming language and of its particular syntax. As many users do not have such knowledge, their ability to store, process, retrieve or analyze digital data is greatly limited. Specifically, as programming languages are complex with syntax requirements, thousands or millions of technology users are often unable to perform desired operations or do so incorrectly.

BRIEF DESCRIPTION OF THE DRAWINGS

Illustrative examples are described in detail below with reference to the following figures.

DETAILED DESCRIPTION

Figure 1A:
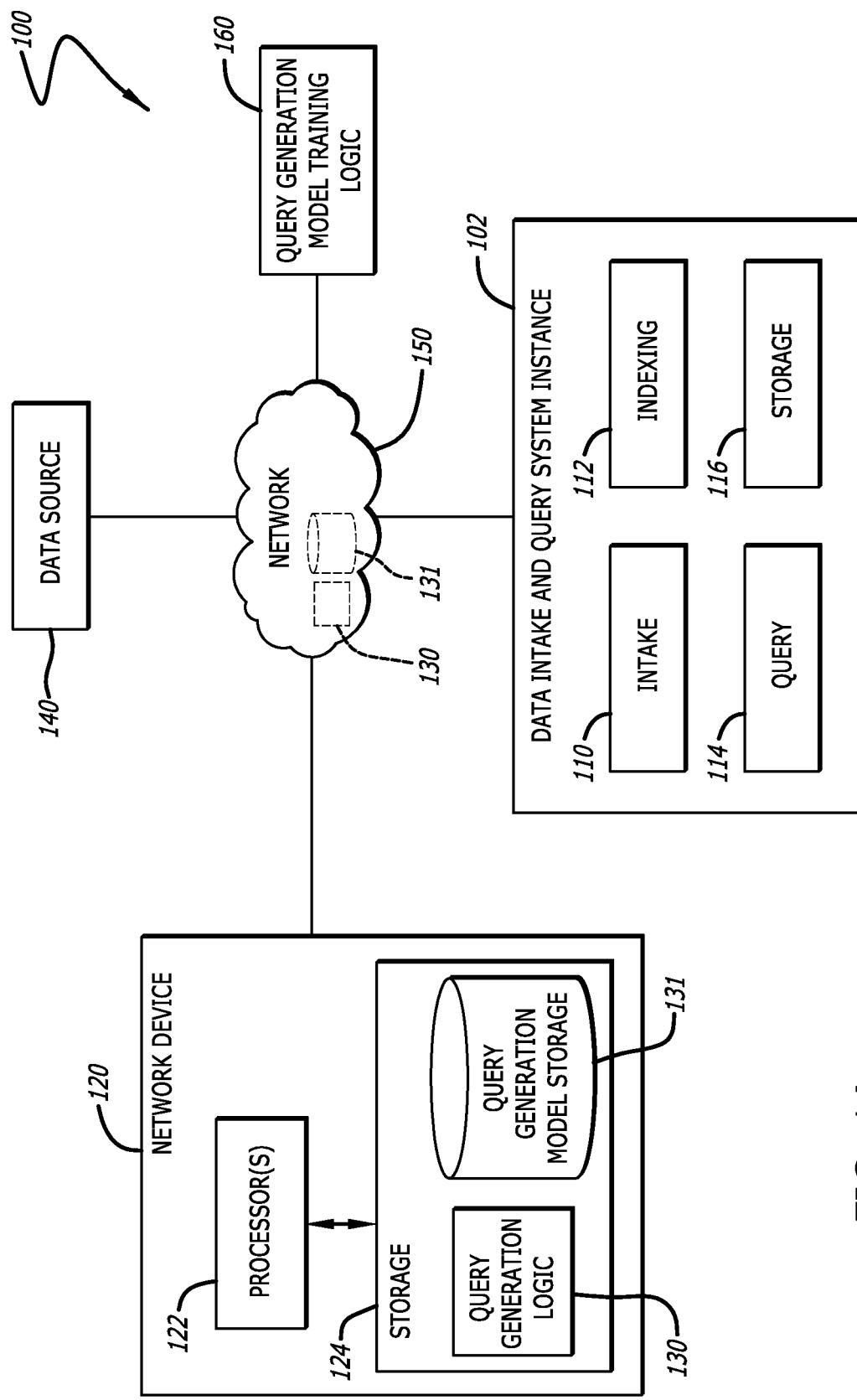
FIG. 1A is a block diagram of an illustrative data processing environment in accordance with various implementations of the present disclosure.

Thousands, if not millions, of people utilize various programming languages for storing, processing, or retrieving digital data from databases on a daily basis. As the use of computers and computer programming becomes even more integral in today's society, the number of people that need to utilize programming languages to interface with databases is only going to increase. However, utilizing a programming language to interface with a database requires some knowledge of the programming language and the database structure. Further, in order to utilize the programming language and database to the greatest extent possible, one often needs a deep understanding of the programming language. As these programming languages are complex and have varying syntax requirements, the thousands or millions of users are often unable to perform the exact operations they desire or do so incorrectly.

One such example of a programming language is Search Processing Language (SPL), developed by SPLUNK Inc. ("Splunk"). SPL is a powerful, yet complex, domain specific language that encompasses numerous search commands, functions, arguments, and clauses. For example, the scope of SPL includes data searching, filtering, modification, manipulation, insertion, and deletion. SPL enables users to interact with various software products and offers a lot of flexibility, allowing users to search through machine data, security events, observability logs, etc., to perform federated search and analytics. Through the search and analytics, users may perform operations such as data investigation, anomaly detection, machine learning model training, etc. However, as noted, SPL is a complex domain specific language having its own syntax resulting in a steep learning curve for new users.

The following disclosure provides for systems and methods, and multiple implementations for deploying the same, directed to automatically translating a natural language description of a search query to a search query statement, such as an SPL query statement, using artificial intelligence (AI). In some instances, the artificial intelligence includes generative AI. In some implementations, a method includes operations of training a machine learning model to predict a text output (in a particular programming language, e.g., SPL) from a text input such as text comprising natural language. Text comprising natural language ("natural language description") may refer to text data that is non-executable software code, which may include plain English language text, Spanish language text, etc., pseudo-code (informal software code that may incorporate some syntactical software language aspects as well as some plain language text), etc. As used herein, a natural language description refers to text describing data to be retrieved or analytics to be performed in such a manner that is not executable or syntactically accurate for a particular programming language.

The disclosure provides for multiple implementations for deploying the systems and methods for automatically translating a natural language description of a search query to a search query statement using artificial intelligence. In some implementations, a graphical user interface (GUI) may be generated that is configured to receive user input corresponding to a selection of a data index and further to a natural language description of a search query. Logic of the system may process and analyze the natural language description using a machine learning model that is trained to predict one or more executable search query statements that represent the search query described by the user input. In some implementations, the machine learning model may be a generative pre-trained transformer trained to transform the natural language description to executable software code (an executable search query statement). In some implementations, the machine learning model may be a text-to-text transfer transformer model that is trained to transform the natural language description to executable software code (an executable search query statement). Additionally, the one or more search query statements predicted by the machine learning model are presented to a user via the GUI, where the GUI may be configured to receive user input selecting one or more of the predicted search query statements to be executed on a selected data index (or other storage location). In some implementations, a search query statement automatically generated by the machine learning model may be executed by a data intake and query system as described below.

The systems and methods, and implementations of deployment afford numerous advantages to users. For example, as querying programming languages are complex and have particular syntax rules that need to be followed, crafting executable search query statements that accurately reflect a desired search query or analysis is a difficult task. Specifically, SPL is a complex, domain specific language that has a steep learning curve for new users. However, in order to utilize the systems and methods described herein, users only need to have a sense of the search query or analysis they want to be executed and be able to provide a natural language description of that. As a result, users of any level of expertise may utilize the disclosed systems and methods to automatically generate executable search query statements and subsequently execute such.

It should also be understood that in some embodiments, the artificial intelligence may be utilized to provide a natural language description of an executable search query statement. Thus, in some instances, any of the machine learning models discussed below may be trained using the training data discussed below, e.g., pairings of search query statements and the corresponding natural language descriptions, such that the trained machine learning model is configured to receive as input a search query statement (e.g., an SPL statement), and provide a natural language description as an output.

Referring now to FIG. 1A, a block diagram of an illustrative data processing environment is shown in accordance with various implementations of the present disclosure. Generally, the data processing environment 100 refers to an environment that provides for, or enables, the management, storage, and retrieval of data including the generation of search query statements from a natural language description of a search query to be performed using artificial intelligence. The data processing environment 100 includes a data intake and query system instance 102 ("data intake and query system") that is shown to comprise an intake system 110, an indexing system 112, a query system 114, and a storage system 116. Also present in the processing environment 100 may be a query generation logic 130, a query generation model storage 131, and a query generation model training logic 160. In some embodiments, the query generation logic 130 and the query generation model storage 131 may be downloaded and configured to process on the network device 120. In other embodiments, the query generation logic 130 and the query generation model storage 131 may be stored and configured to process on the network 150. The query generation model training logic 160 may also be stored and configured to process on the network 150 or may be stored and configured to process on separate processing resources (e.g., local enterprise computing resources).

As will be discussed in further detail below, the query generation logic 130 is configured to provide functionality including receive user input being a natural language description of a search query, process the user input with a trained machine learning model resulting in the prediction of one or more executable search query statements, which may be executed by the data intake and query system 102, and provide results of the executed search query statement to the user on a display of the network device 120. In some examples, upon receiving the user input being a natural language description of a search query, the query generation logic 130 may retrieve a trained machine learning model from the query generation model storage 131 and cause execution thereof to process the user input.

Specifically, the query generation logic 130—including its provided user interfaces and logic—provides a graphical user interface that assists users in utilizing the storage and query functionality of the data intake and query system 102 through automated generation of executable search query statements that may otherwise consume large amounts of resources (e.g., time of a subject matter expert) and/or may be outside of the scope of knowledge or the expertise of the user of the network device 120. The query generation logic 130 may be configured to automatically generate one or more executable search query statements from a received natural language description of a search query, cause execution of the same by the data intake and query system 102 and provide the results of such in certain visuals intended to assist the user in exploring the data of the selected index. As should be understood, a novice user presented with the task of crafting search query statements to retrieve or analyze data from a specific data index is a daunting task. Thus, the user interfaces and logic of the query generation logic 130 assists a user in such endeavors.

In some embodiments, the environment 100 includes the data intake and query system 102 communicatively coupled to one or more network devices 120 and one or more data sources 140 via a communications network 150. The network 150 may include an element or system that facilitates communication between the entities of the environment 100. The network 150 may include an electronic communications network, such as the Internet, a local area network (LAN), a wide area network (WAN), a wireless local area network (WLAN), a cellular communications network, and/or the like. In some instances, the network 150 may represent a LAN and computing resources that are located and operate in an "on-prem" environment, such as at an enterprise facility or site. In some embodiments, the network 150 can include a wired or a wireless network. In some embodiments, the network 150 can include a single network or a combination of networks. In some embodiments, the network 150 may represent a network (e.g., the Internet) and cloud computing resources, which may include vast amounts of non-transitory computer-readable medium, and processors configured to execute logic store on the transitory computer-readable medium.

As discussed in greater detail below, the indexing system 112 obtains machine data from a data source such as the data source 140 then processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored.

The data source 140 may be a source of incoming source data being fed into the data intake and query system 102. A data source 140 can be or include one or more external data sources, such as web servers, application servers, databases, firewalls, routers, operating systems, and software applications that execute on computer systems, mobile devices, sensors, and/or the like. Data source 140 may be located remote from the data intake and query system 102. For example, a data source 140 may be defined on an agent computer operating remote from the data intake and query system 102, such as on-site at a customer's location, that transmits source data to data intake and query system 102 via a communications network (e.g., network 150).

The source data provided by data source 140 may be a stream or set of data fed to an entity of the data intake and query system 102, such as a forwarder (not shown) or the indexing system 112. In some embodiments, the source data can be heterogeneous machine-generated data received from various data sources 140, such as servers, databases, applications, networks, and/or the like. The source data may include, for example raw data (e.g., raw time-series data), such as server log files, activity log files, configuration files, messages, network packet data, performance measurements, sensor measurements, and/or the like. For example, source data may include log data generated by a server during the normal course of operation (e.g., server log data). In some embodiments, the source data may be minimally processed to generate minimally processed source data. For example, the source data may be received from a data source 140, such as a server. The source data may then be subjected to a small amount of processing to break the data into events. As discussed, an event generally refers to a portion, or a segment of the data, that is associated with a time. The resulting events may be indexed (e.g., stored in a raw data file associated with an index file). In some embodiments, indexing the source data may include additional processing, such as compression, replication, and/or the like.

As can be appreciated, source data might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

The storage 116 may include a medium for the storage of data thereon. For example, storage 116 may include non-transitory computer-readable medium storing data thereon that is accessible by entities of the environment 100, such as the query generation logic 130. As can be appreciated, the storage 116 may store the data (e.g., events) in any manner. In some implementations, the data may include one or more indexes including one or more buckets, and the buckets may include an index file and/or raw data file (e.g., including parsed, time-stamped events). In some embodiments, each data store is managed by a given indexer that stores data to the data store and/or performs searches of the data stored on the data store. Although certain embodiments are described with regard to a single storage 116 for purposes of illustration, embodiments may include employing multiple storages 116, such as a plurality of distributed data stores.

As described, events within the storage 116 may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In the context of server log data, for example, an event may correspond to a log entry for a client request and include the following values: (a) a time value (e.g., including a value for the data and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer protocol) code value (e.g., including a value representative of an HTTP status code), and/or the like. That is, each event may be associated with one or more values. Some events may be associated with default values, such as a host value, a source value, a source type value and/or a time value. A default value may be common to some of all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, values representative of the characteristics may be added to (or otherwise associated with) the event. In the context of server log data, for example, if an event is received from Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given event. In the context of server log data, for example, a server that logs activity every second may generate a log entry every second, and the log entries may be stored as corresponding events of the source data. Similarly, a server that logs data upon the occurrence of an error event may generate a log entry each time an error occurs, and the log entries may be stored as corresponding events of the source data.

The network device 120 may be used or otherwise accessed by a user, such as a system administrator or a customer. A network device 120 may include any variety of electronic devices, any of which include one or more processors 122 and storage 124 (such as non-transitory, computer-readable medium). In some embodiments, a network device 120 can include a device capable of communicating information via the network 150. A network device 120 may include one or more computer devices, such as a desktop computer, a server, a laptop computer, a tablet computer, a wearable computer device, a personal digital assistant (PDA), a smart phone, and/or the like. In some embodiments, a network device 120 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a network device 120 can include general computing components and/or embedded systems optimized with specific components for performing specific tasks. In some embodiments, a network device 120 can include programs/applications that can be used to generate a request for content, to provide content, to render content, and/or to send and/or receive requests to and/or from other devices via the network 150. For example, a network device 120 may include an Internet browser application that facilitates communication with the data intake and query system 102 via the network 150. In some embodiments, a program, or application, of a network device 120 can include program modules having program instructions that are executable by a computer system to perform some or all of the functionality described herein with regard to at least network device 120.

The query generation model training logic 160 is generally configured to, upon execution by one or more processors, perform operations of acquiring training data for training one or more machine learning models to generate one or more search query statements from a natural language description of a search query. In some implementations, sources of training data may include community forums, online query language documentation, manually created training data, training data automatically generated by a machine learning model (e.g., a natural language model), etc. In some instances, such as with community forums, the data posted to a community forum may be parsed and searched with examples of natural language descriptions and corresponding search query statements extracted as training data. In some implementations, a propriety software compiler may convert a first known programming language (e.g., structured query language (SQL)) that has a large pool of corresponding natural language descriptions to a second programming language (e.g., SPL) and pair the natural language descriptions with the second programming language. As one specific example, training data may be obtained from public Text-to-SQL datasets by using a proprietary compiler that translates SQL to SPL so that the natural language descriptions within the public Text-to-SQL datasets may be paired with SPL to create a similar text-to-SPL dataset. Various machine learning models may then be trained on the training data including, but not limited to, transformer deep learning models such as bidirectional encoder pretrained systems (BERT) and generative pretrained transformer (GPT), or recurrent neural networks (RNN) such as long short-term memory (LSTM). Some specific examples of models may include GPT-2, GPT-3, GPT-4, T5, Codex, PICARD, t5-small, etc. In some instances, the query generation model training logic 160 may train multiple models on a single set of training data. In some instances, training data sets may be based on language (e.g., English, Spanish, German, etc.) so that a particular model may be trained specifically to translate natural language description in a given language. In other implementations, one or more models may be trained using a training data set combining natural language descriptions of multiple languages.

Figure 1B:
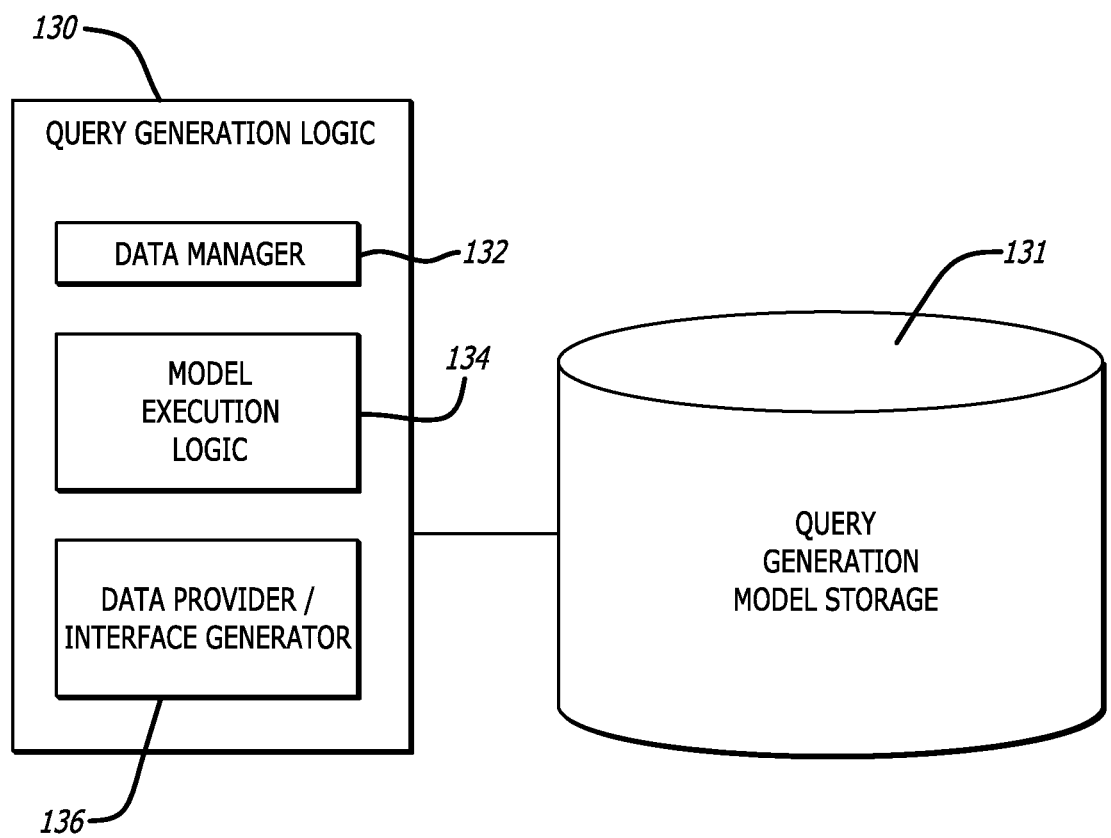
FIG. 1B is a block diagram of a query generation logic, in accordance with various implementations of the present disclosure.

Referring to FIG. 1B, a block diagram of a query generation logic is shown in accordance with various implementations of the present disclosure. The query generation logic 130 is generally configured to perform operations including receiving user input being a natural language description of a search query, processing the user input with a trained machine learning model resulting in the prediction of one or more executable search query statements, which may be executed by the data intake and query system 102, and providing results of the executed search query statement to the user on a display of the network device 120. To perform such operations, the query generation logic 130 is comprised of a data manager 132, a model execution logic 134, and a data provider/interface generator ("interface generator") 136. The query generation logic 130 can include any number of other components not illustrated. In some embodiments, one or more of the illustrated components 132, 134, and 136 (including any sub-modules) can be integrated into a single component or can be divided into a number of different components. Components 132, 134, and 136 can be implemented on any number of machines and can be integrated, as desired, with any number of other functionalities or services.

The data manager 132 is configured to manage data, such as incoming user input. Examples of the user input may include, but are not limited or restricted to, selection of a data index, a natural language description of a search query, and/or selection of an automatically generated search query to be executed on the selected data index.

Generally, the data manager 132 obtains user input, for example, provided via an input receiving mechanism of the network device 120 (such as a keyboard, real or virtual, or microphone to capture audible input). However, the data manager 132 may obtain user input from any number of sources (such as those communicatively coupled to the network device, such as a wireless or wired keyboard). The data manager 132 may provide received user input to the model execution logic 134 for data processing. In some embodiments, such as when the query generation logic 130 is downloadable and processing on the network device, the data manager 132 may receive trained machine learning models and provides such to the query generation model storage 131 for storage therein.

Generally, the model execution logic 134 may be configured to receive the user input from the data manager 132. When the user input corresponds to a natural language description of a search query, the model execution logic 134 is configured to, upon execution by one or more processors, and process the natural language description through the use of artificial intelligence (e.g., via a trained machine learning model) and predict one or more executable search query statements that are representative of the natural language description. The selection of a data index provides the query generation logic 130 with a particular location of data the user desires to explore. For instance, the query generation logic 130 may provide suggested search queries based on the fields of the data stored at the selected data index. Further, the selected index will be provided to the data intake and query system 102 following selection of an automatically generated search query statement for execution of the statement thereon.

The interface generator 136 is generally configured to, upon execution by one or more processors, generate certain visuals based on received user input, search query results and/or analyses results. The visuals may be displayed in varying manners, with some visuals configured for specific network device types (e.g., mobile devices such as smart phones or tablets). Non-limiting examples of visuals are illustrated in FIGS. 2-5B. As will discussed in further detail below, some illustrative examples of visualizations generated by (and often revised upon receipt of additional user input, search query results, and/or analyses results) include a graphical user interface having multiple display sections such as a data preview section, a translation section, and an execution section, a graphical user interface including a chatbox that is configured to provide responses to user input that is automatically generated through a generative pre-trained transformer (machine learning model) trained to transform the natural language description to executable software code and, optionally, provide results of a search query or analyses within the chatbox, and a graphical user interface configured for a mobile display screen and to receive audible user input via a microphone of the network device.

Figure 2:
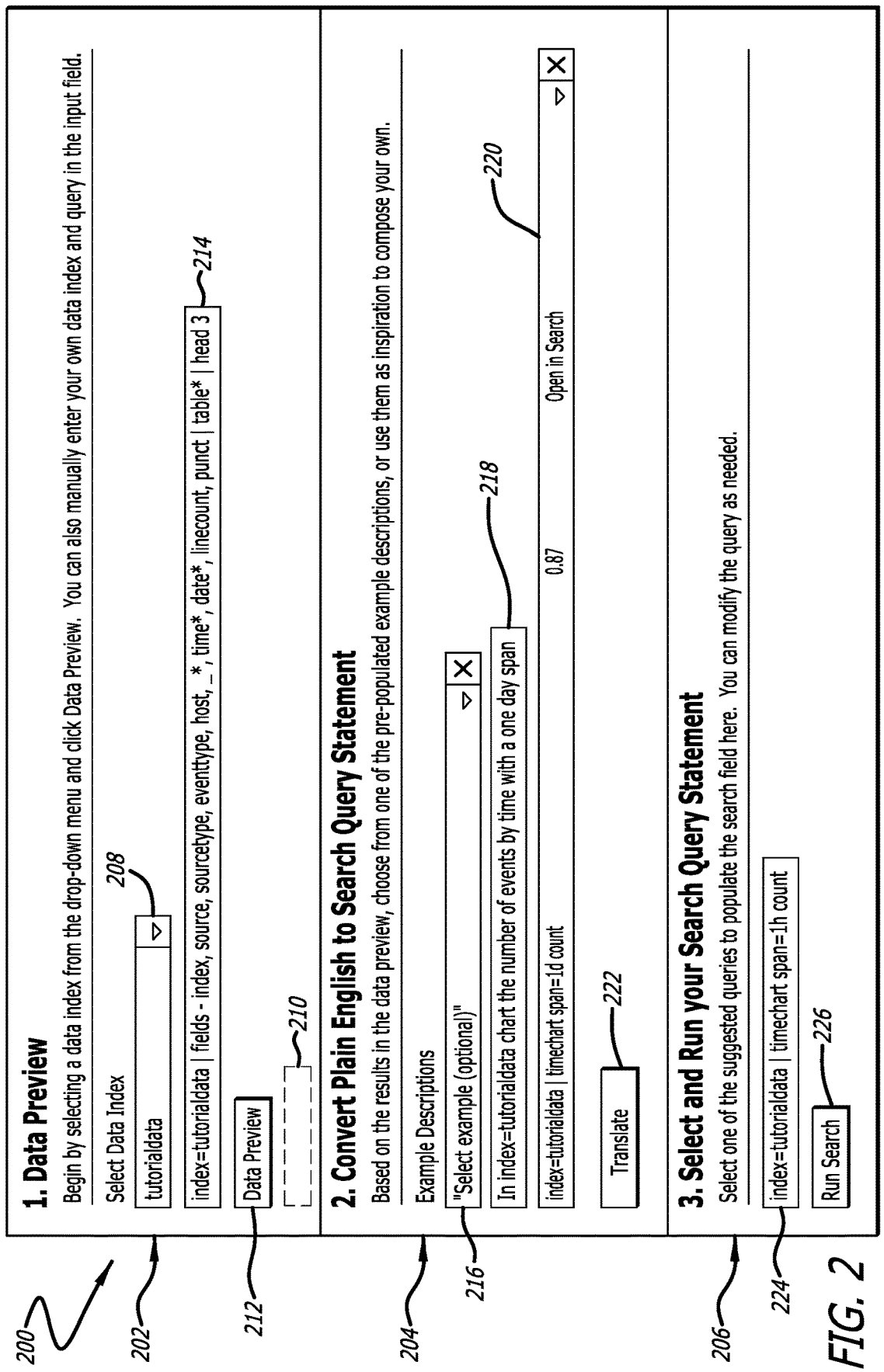
FIG. 2 is an illustrative graphical user interface of a first deployment methodology of the process of automatically generating search query statements from a natural language description that is translated through artificial intelligence techniques according to an implementation of the disclosure.

Referring to FIG. 2, an illustrative graphical user interface of a first deployment methodology of the process of automatically generating search query statements from a natural language description that is translated through artificial intelligence techniques is shown according to an implementation of the disclosure. The graphical user interface (GUI) 200 illustrates one example implementation of a user interface that provides a user access to the query generation logic 130 of FIG. 1A. The GUI 200 is shown to include three display sections 202, 204, 206. The display section 202 (or data preview section) is configured to receive user input corresponding to selection of a data index or other data storage location. The data preview section 202 may include an input receiving component 208 that is configured to receive the user input. The input receiving component 208 may one of a variety of input types with examples being a text box, a checkbox, a radio button, a dropdown list, etc. In some instances, the input receiving component 208 may be a HyperText Markup Language (HTML) input type, e.g., when the GUI 200 is configured to be displayed within a web browser. Upon receipt of the user input corresponding to selection of a data index (e.g., "tutorialdata"), a retrieval operation of at least a portion of data stored at the selected data index is performed, e.g., by the data intake and query system 102, and the query generation logic 130 may cause the retrieved data to be displayed within a display sub-portion 210 of the data preview section 202 (see FIG. 3A for illustrative details). The data displayed in the sub-portion 210 may allow the user to preview the data at the selected index. In some instances, the retrieval and display of data in the display sub-portion 210 may occur following user input activating a "data preview" button 212 (however, the button may include alternative text or no text at all). In some instances, the query generation logic 130 of FIG. 1A may also display the search query statement 214 that is executed to retrieve the data at the selected data index.

The GUI 200 is also shown to include the display section 204 (or translation section) that is configured to receive user input corresponding to either (i) the selection of a suggested search query statement from a listing of suggested search query statements 216, or (ii) a natural language description 218 that describes the intent or operations of a search query. Referring to user input being a natural language description, such user input 218 may be received in, for example, a text box. Following receipt of the user input, the query generation logic 130 of FIG. 1A may perform operations to automatically translate the user input 218 (or selection of a suggested search query statement 216) to one or more executable search query statements (e.g., SPL statements) 220 using artificial intelligence, which may include processing of the user input with a trained machine learning model as discussed above. FIG. 2 illustrates one example executable search query statement 220; however, FIG. 3B illustrates that a plurality of executable search query statements may be generated and provided. In some instances, the query generation logic 130 of FIG. 1A may perform these operations following activation of a "translate" button 222 (however, the button may include alternative text or no text at all, e.g., button may include an arrow indicating "go"). Following performance of these operations the one or more executable search query statements 220 may then be displayed in the translation section 204. A user may then provide subsequent user input corresponding to selection of a search query statement that was automatically generated by the query generation logic 130 of FIG. 1A.

The suggested search query statement may correspond to predetermined search query statements that are selected from a repository of predetermined search statements based on characteristics of the selected data index. For example, based on the fields of the data located at the data index, the listing of suggested search query statements 216 may be chosen for display through a heuristic or other rules-based analysis as performed by the query generation logic 130 of FIG. 1A. A suggested search query statement may provide a base for a user to modify using either natural language or syntax of a particular programming language (e.g., SPL). In some implementations, translation section 204 may not provide suggested search query statements.

The GUI 200 is also shown to include the display section 206 (or execution section) that is configured to display result(s) of the execution of a selected search query statement (e.g., either an automatically generated search query statement or a predetermined suggested search query statement). In some implementations, following user input selecting a search query statement provided in the translation section 204, the selected search query statement 224 may be displayed in the execution section 206 along with a "run search" button 226 (however, the button may include alternative text or no text at all), such that activation of the button 226 results in execution of the selected search query statement 224 by the data intake and query 102 of FIG. 1A. The result(s) may then be displayed in the execution section 206 (see FIG. 3C). In some implementations, the results may be exportable or downloadable, stored in a designated storage location, printed, and/or automatically provided to a designated address (e.g., uniform resource locator (URL), uniform resource indicator (URI), internet protocol (IP) address, email address, etc.).

Figure 3A:
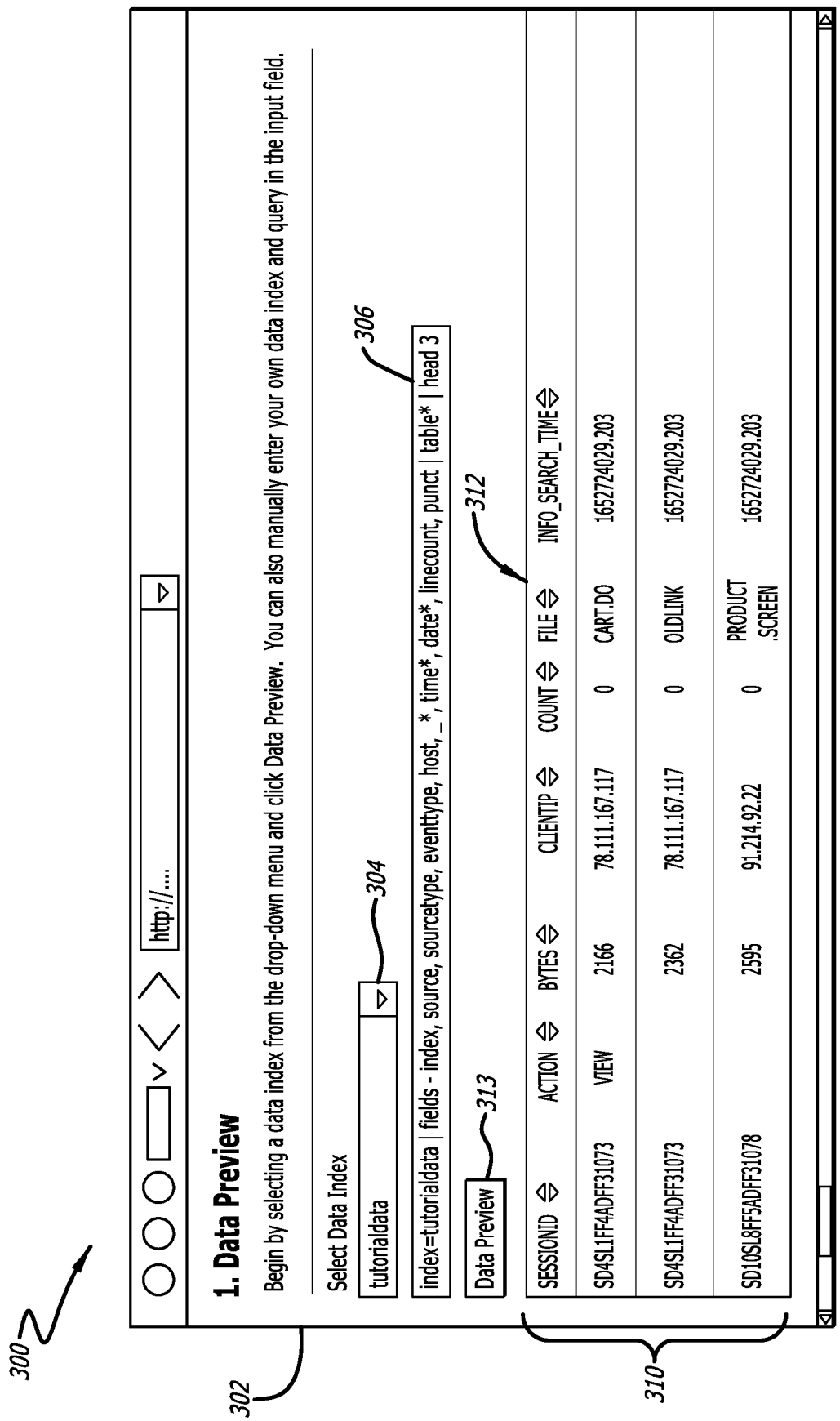
FIG. 3A illustrates a first portion of the graphical user interface of FIG. 2 providing a detailed view of a data preview section according to an implementation of the disclosure.
Figure 3B:
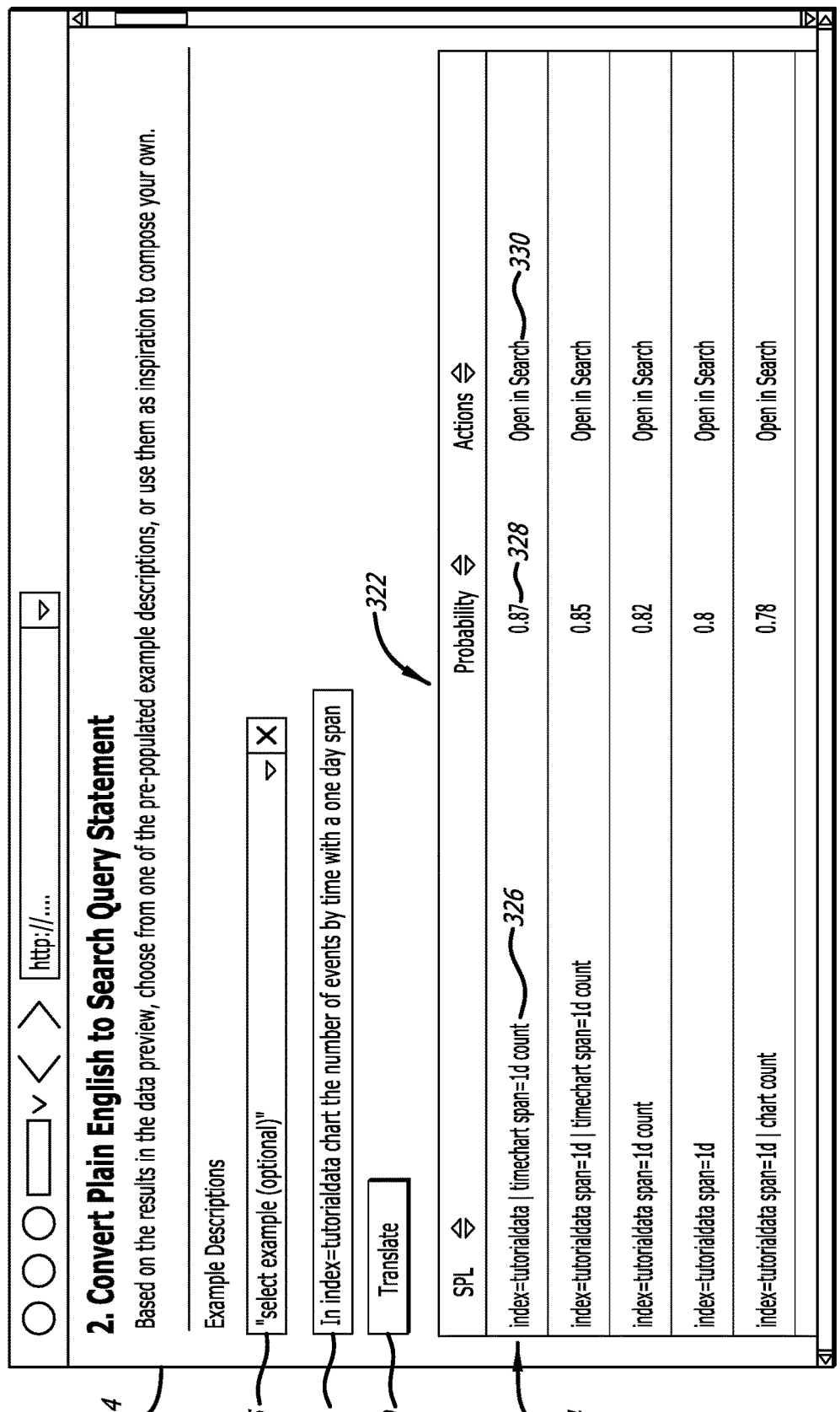
FIG. 3B illustrates a second portion of the graphical user interface of FIG. 2 providing a detailed view of a translation section according to an implementation of the disclosure.
Figure 3C:
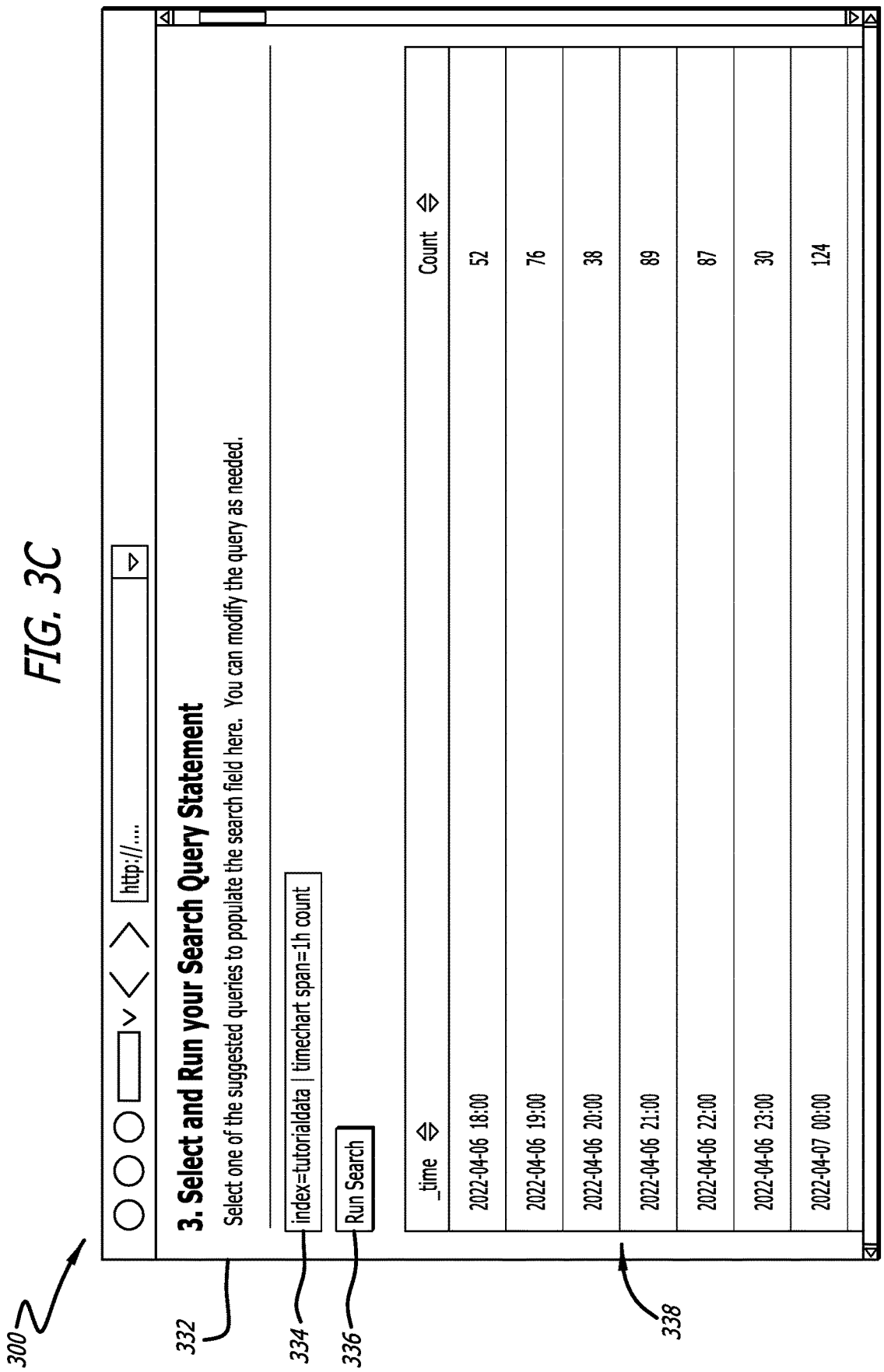
FIG. 3C illustrates a third portion of the graphical user interface of FIG. 2 providing a detailed view of a search query execution section according to an implementation of the disclosure.

Referring to now FIG. 3A, a first portion of the graphical user interface of FIG. 2 providing a detailed view of a data preview section is shown according to an implementation of the disclosure. FIGS. 3A-3C each illustrate a portion of the GUI 300 with FIG. 3A illustrating a first portion, a display section 302 (or data preview section), which corresponds to the display section 202 of FIG. 2. The display section 302 is configured to receive user input corresponding to selection of a data index or other data storage location. The data preview section 302 may include an input receiving component 304 that is configured to receive the user input (e.g., selection of the data index "tutorialdata"). As an illustrative example, the input receiving component 304 is a dropdown list, which may provide several data indexes from which a user may select. In some implementations, a user may be required to provide authentication credentials upon selecting a particular data index thereby restricting access to certain data indexes. In other implementations, a user may provide authentication credentials prior to accessing the input receiving component 304 such that only data indexes to which the user has access are displayed or selectable.

Upon receipt of the user input corresponding to selection of a data index (e.g., "tutorialdata"), a retrieval operation of at least a portion of data stored at the selected data index is performed and the query generation logic 130 of FIG. 1A causes the retrieved data to be displayed within a display sub-portion 310 of the data preview section 302. In some instances, the retrieval and display of data in the display sub-portion 310 may occur following receipt of user input activating a "data preview" button 313. In some instances, the query generation logic 130 of FIG. 1A may also display the search query statement 306 that is executed to retrieve the data at the selected data index. As illustrated, the sub-portion 310 may display a portion of the retrieved data in a table 312 providing columns for fields within a set of events stored at the data index, where the retrieved events correspond to the rows of the table 312.

Referring to FIG. 3B, a second portion of the graphical user interface of FIG. 2 providing a detailed view of a translation section is shown according to an implementation of the disclosure. In FIG. 3B, a display section 314 (or translation section) of the GUI 300 is shown, which corresponds to the display section 204 of FIG. 2. The translation section 314 is configured to receive user input corresponding to either (i) a natural language description 318 that describes the intent or operations of a search query, or (ii) the selection of a suggested search query statement from a listing of suggested search query statements 316. Following receipt of the user input 318 being a natural language description, the query generation logic 130 of FIG. 1A may perform operations to automatically translate the user input 318 to one or more executable search query statements (e.g., SPL statements), which are displayed in table 322. The automatic generation of the search query statements may be performed through artificial intelligence, which may include processing of the user input with a trained machine learning model as discussed above.

FIG. 3B illustrates that a plurality of executable search query statements may be generated and provided. In some implementations, the table 322 provide a set of rows, where an example row 324 is shown to include a search query statement 326, a probability 328 indicating a likelihood that the search query statement 326 accurately represents the natural language description 318, and, optionally, an actionable item (e.g., a link to an IP address) 330, that may correspond to execution of the search query statement 326. In some instances, the query generation logic 130 of FIG. 1A may perform the generation operations following activation of a "translate" button 320. Following performance of these operations the one or more executable search query statements 220 may then be displayed in the translation section 204.

Further user input may be received by the GUI corresponding to selection of any of the search query statements within the table 322. A user may then provide subsequent user input corresponding to selection of a search query statement that was automatically generated by the query generation logic 130 of FIG. 1A. In some implementations, a user may insert a search query statement from the table 322 into the text box in place of user input 318 and provide modifications through natural language and perform an additional iteration of the generation operations.

Referring to FIG. 3C, a third portion of the graphical user interface of FIG. 2 providing a detailed view of a search query execution section is shown according to an implementation of the disclosure. In FIG. 3C, a display section 332 (or translation section) of the GUI 300 is shown, which corresponds to the display section 206 of FIG. 2. The execution section 332 is configured to display result(s) of the execution of a selected search query statement (e.g., either an automatically generated search query statement or a predetermined suggested search query statement), such as the search query statement 326 of FIG. 3B. In some implementations, following user input selecting a search query statement provided in the translation section 332, the selected search query statement 334 may be displayed in the execution section 332 along with a "run search" button 336, such that activation of the button 336 results in execution of the selected search query statement 334 by the data intake and query 102 of FIG. 1A. The result(s) 338 may then be displayed in the execution section 206. In some implementations, the results 338 may be exportable or downloadable, stored in a designated storage location, printed, and/or automatically provided to a designated address (e.g., uniform resource locator (URL), uniform resource indicator (URI), internet protocol (IP) address, email address, etc.).

Figure 4A:
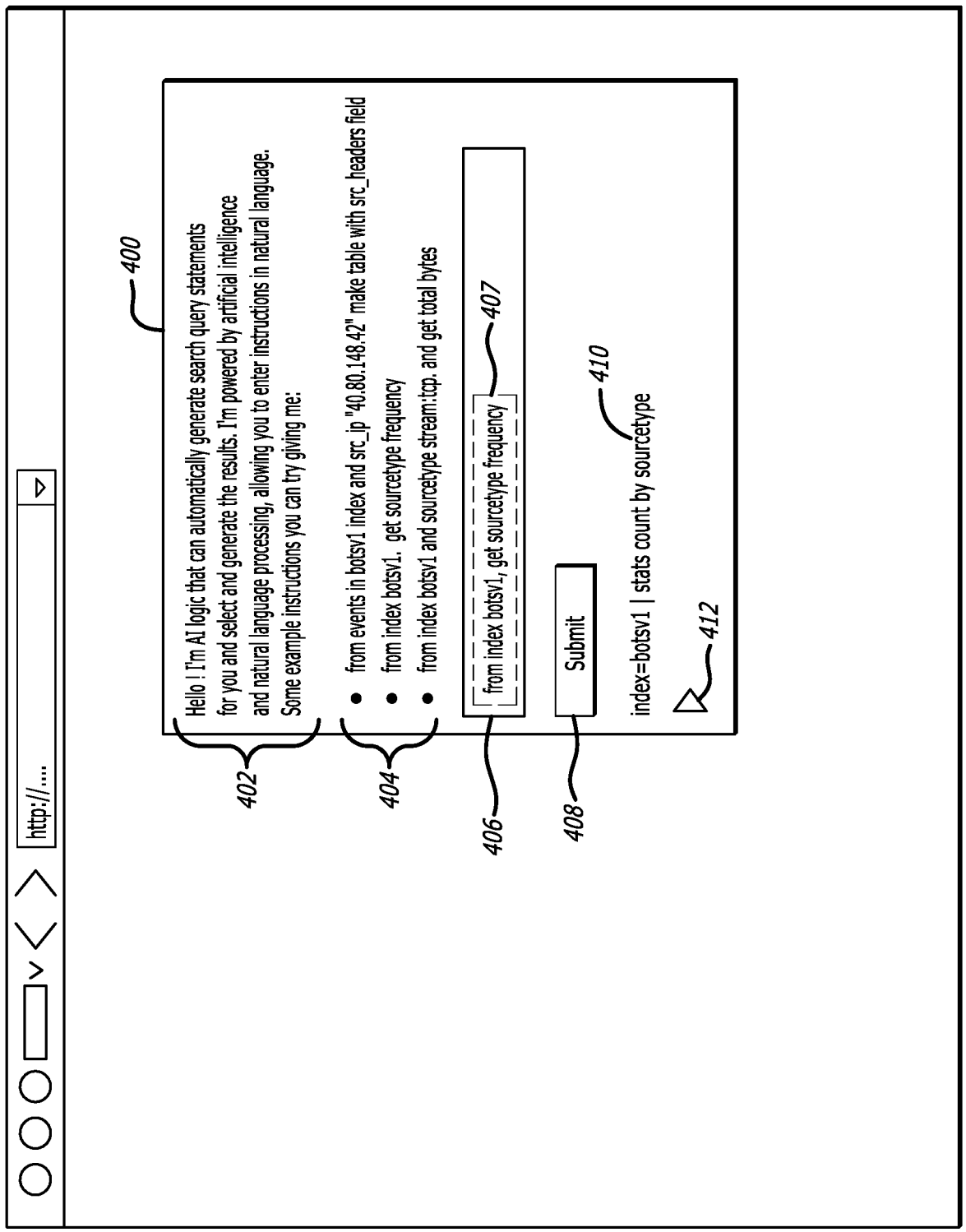
FIG. 4A is an illustrative graphical user interface of a second deployment methodology of the process of automatically generating search query statements from a natural language description that is translated through generative artificial intelligence techniques according to an implementation of the disclosure.

Referring now to FIG. 4A, an illustrative graphical user interface of a second deployment methodology of the process of automatically generating search query statements from a natural language description that is translated through generative artificial intelligence techniques is shown according to an implementation of the disclosure. FIG. 4A illustrates a display screen 400 that may appear as a popup over a webpage 401 displayed by a web browser operating on a network device, such as the network device 120 of FIG. 1A. The display screen 400 may be a chatbox that is configured to display instructional text 402 pertaining to the capabilities of logic behind the operability of the chatbox such as the query generation logic 130 of FIG. 1A. Further, the chatbox 400 may include suggested natural language descriptions 404 as examples of the user input to provide in the input receiving component 406. The input receiving component 406 may, for example, a text box. As shown, user input 407 ("from index botsv1, getsourcetype frequency") has been received in the input receiving component 406. The user input 407 is considered a natural language description of a search query as it does not follow the syntax required for the text to be executable, e.g., by the data intake and query system 102 of FIG. 1A.

In some implementations, upon activation of a "submit" button 408 (however, the button may include alternative text or no text at all), the query generation logic 130 of FIG. 1A may receive the user input 407 and initiate operations to analyze the user input 407 using a trained machine learning model to automatically generate one or more executable search query statements 410 that represent the search query described by the natural language description (user input) 407. Further, the chatbox 400 may include a "run" button 412 (although no text is shown, text such as "run" or "execute" may be included).

Figure 4B:
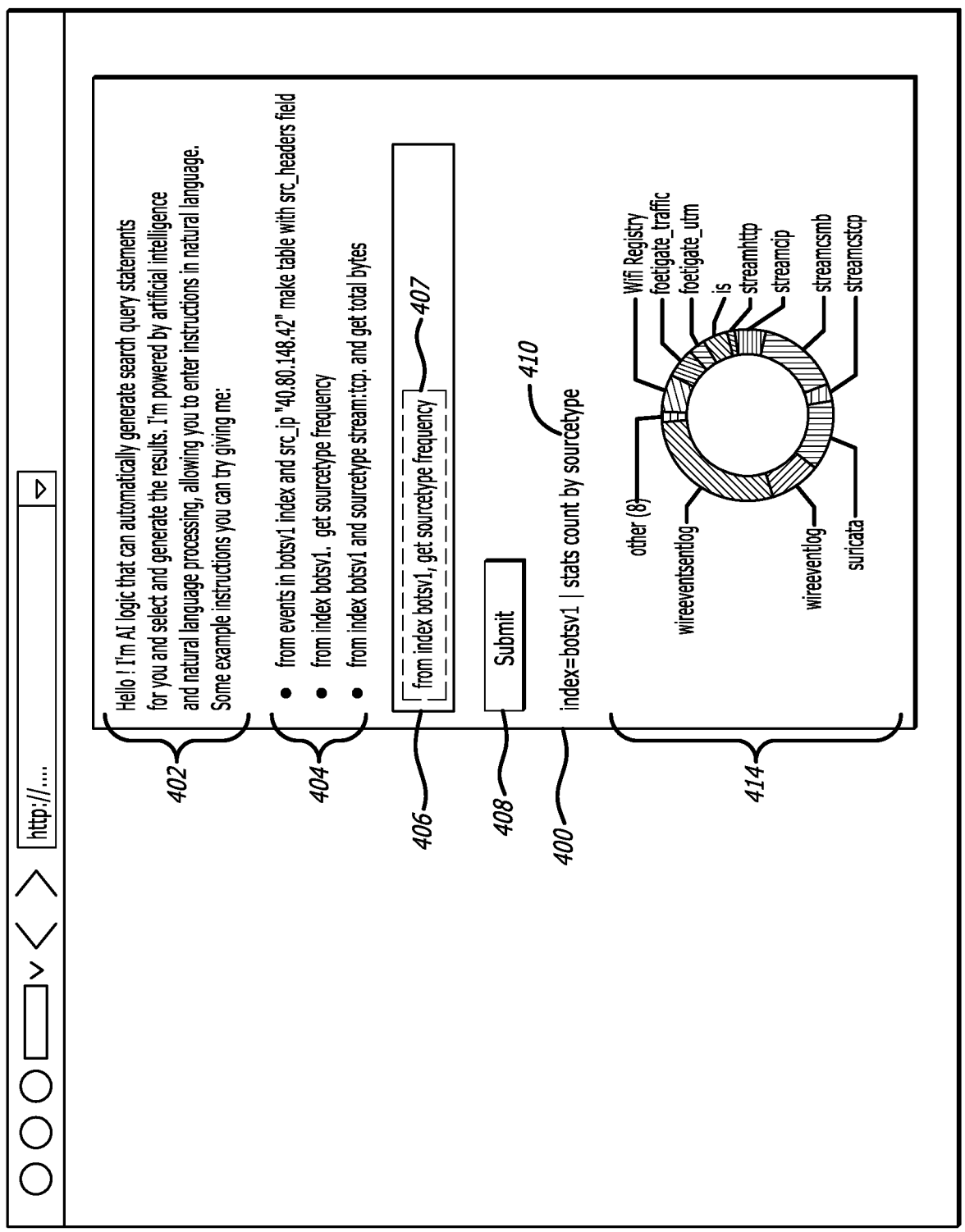
FIG. 4B shows the graphical user interface of FIG. 4A following execution of a suggested search query statement according to an implementation of the disclosure.

Referring to now FIG. 4B, the graphical user interface of FIG. 4A following execution of a suggested search query statement is shown according to an implementation of the disclosure. FIG. 4B illustrates the chatbox 400 of FIG. 4A following activation of the "run" button 412. Specifically, FIG. 4B illustrates the search or analysis results 414 returned following execution of the search query statement 410. In some implementations, results may be returned in a generic table format, e.g., similar to that of table 312 in FIG. 3A. However, in other implementations as shown in FIG. 4B, the query generation logic 130 of FIG. 1A may analyze the results and automatically determine a graphical visualization for displaying the results. For example, a rules-based analysis or heuristics may be utilized by the query generation logic 130 of FIG. 1A to determine the graphical visualization. For instance, the rules-based analysis or heuristics may assign a score to a set of predetermined graphical visualizations according to a weighting system that is dependent on the fields of the events returned from execution of the search query statement 410. In other embodiments, the rules-based analysis or heuristics may analyze the search query statement 410 itself such that particular syntax may weigh in favor of particular graphical visualizations.

In some examples, additional user input may be received directly on the graphical visualization causing a modification of the search query statement 410. For instance, selection of a particular aspect of the graphical visualization (e.g., "Wifi Registry") may cause an automatic modification of the search query statement 410 by adding a "Wifi Registry" filter. The automatic modification may be predetermined according to the graphical visualization. In other implementations, the additional user input to the graphical visualization may cause a modification to the user input 407 such that the user may modify such via additional natural language description and activate the "submit" button 408 to initiate an additional iteration of automatically generating one or more search query statements.

Figure 5A:
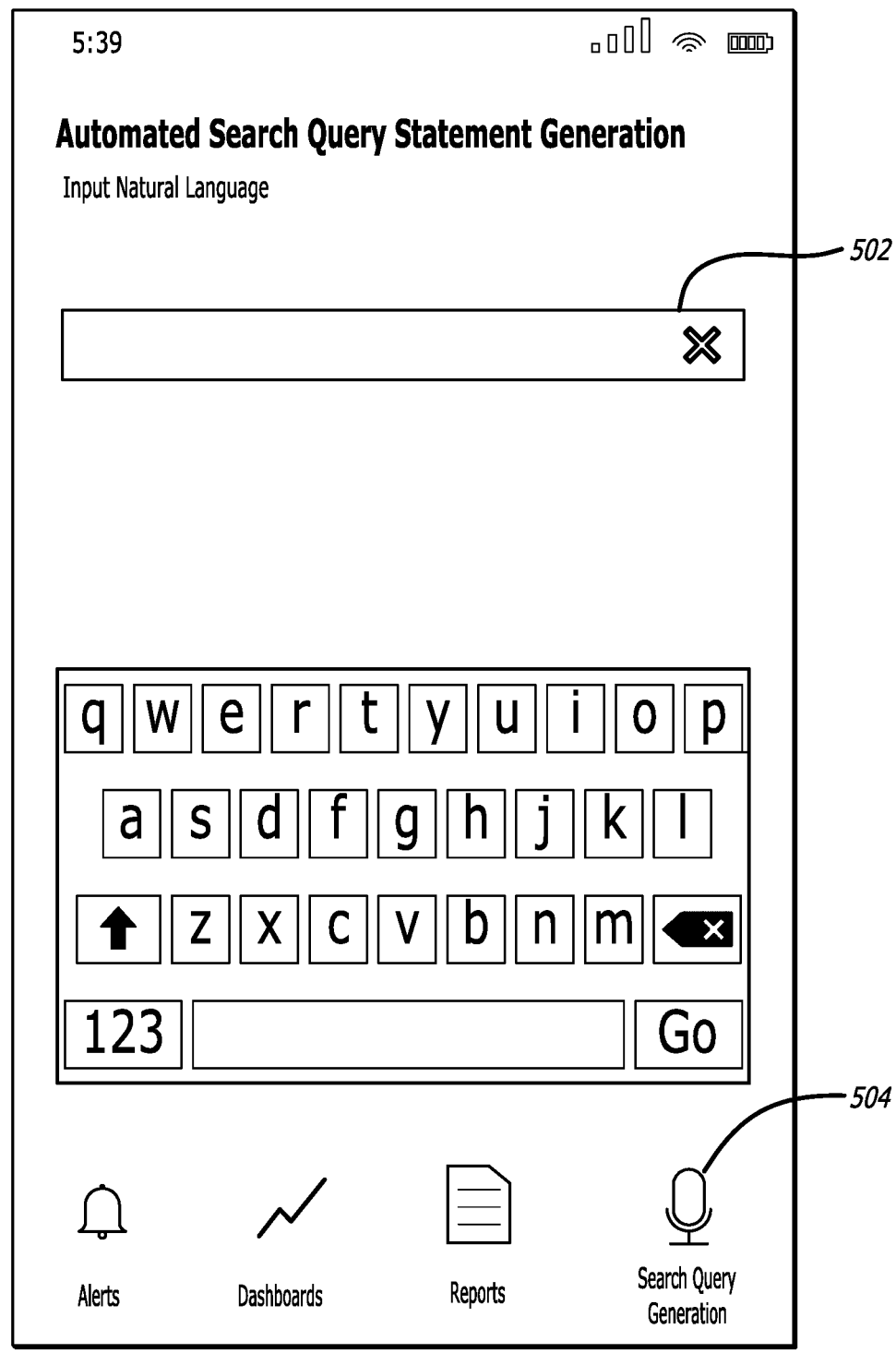
FIG. 5A is an illustrative graphical user interface of a third deployment methodology of the process of automatically generating search query statements from a natural language description that is translated through generative artificial intelligence techniques according to an implementation of the disclosure.

Referring to FIG. 5A, an illustrative graphical user interface of a third deployment methodology of the process of automatically generating search query statements from a natural language description that is translated through generative artificial intelligence techniques is shown according to an implementation of the disclosure. The display screen 500 may be representative of a display of a network device, such as a mobile phone or tablet, that is generated by the query generation logic 130 of FIG. 1A. In such an instance, the query generation logic 130 of FIG. 1A may be downloaded and processing on the network device. FIG. 5A illustrates an implementation of the query generation logic 130 of FIG. 1A where user input of a natural language description of a search query may be received via the microphone of the network device. For example, the icon "search query generation" 504 may be activated by receipt of user input such that the microphone of the network device is activated to receive audible input. The audible input is then translated via voice-to-text translation operations performed by the query generation logic 130 of FIG. 1A, which may be displayed in an input receiving component 502 as shown in FIG. 5B.

Figure 5B:
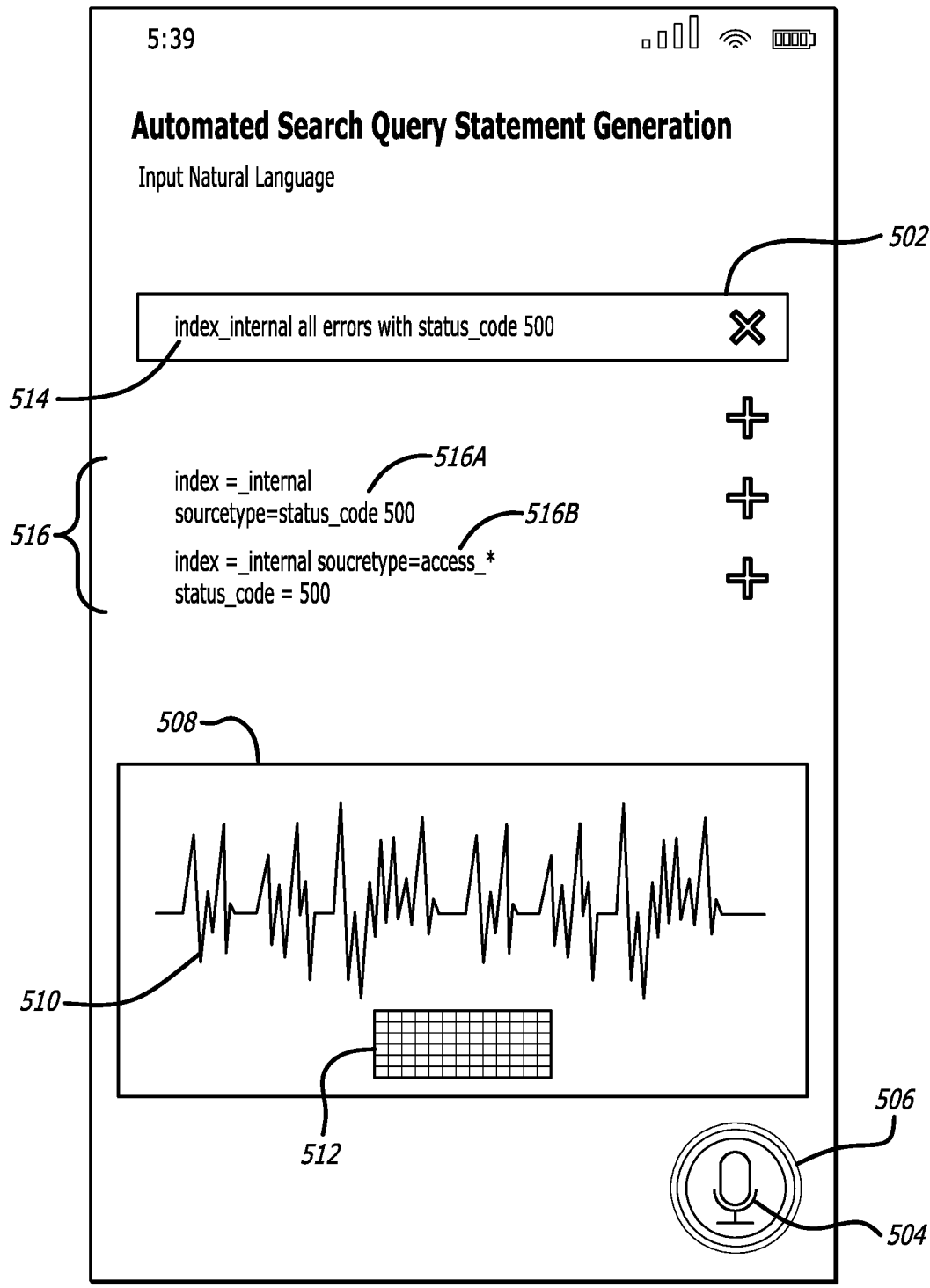
FIG. 5B shows the graphical user interface of FIG. 5A following execution of a suggested search query statement according to an implementation of the disclosure.

Referring now to FIG. 5B, the graphical user interface of FIG. 5A following execution of a suggested search query statement is shown according to an implementation of the disclosure. FIG. 5B illustrates the display screen 500 that includes the input receiving component 502 displaying the result of the voice-to-text translation operations, which may be a natural language description 514 of a search query. The display screen 500 of FIG. 5B illustrates that, upon receipt of user input activating the icon 504, the display 500 may be updated or revised to show an audio recording image or video 510 and an icon 512 enabling the user to return to a standard, virtual keyboard. Additionally, the icon 504 may include an emphasis 506 indicating that the microphone is in use.

Figure 6:
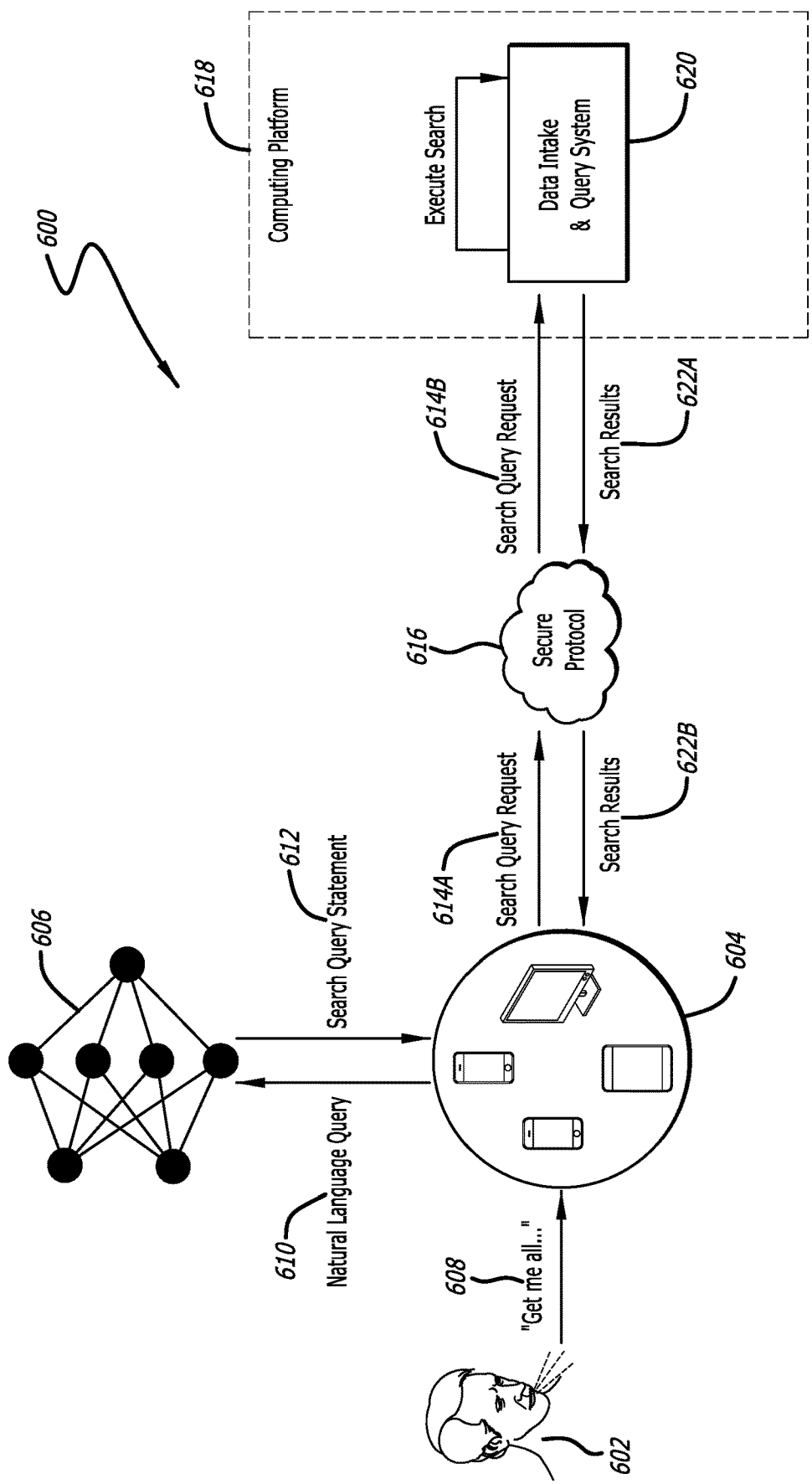
FIG. 6 is a diagrammatic flow illustrating an implementation of the third deployment methodology according to an implementation of the disclosure.

The query generation logic 130 of FIG. 1A may receive the natural language description 514 as input, analyze the natural language description 514 using a trained machine learning model to automatically generate one or more executable search query statements 516A, 516B (collectively, 516) in the same manner as discussed above. As also discussed above, either of the executable search query statements 516 may be selected via user input (e.g., activation of the '+' symbol to the right of the search query statement 516. As shown in FIG. 6, execution of the selected search query statement 516 may be performed on a data intake and query system, such as the data intake and query system 102 of FIG. 1A.

Referring now to FIG. 6, a diagrammatic flow illustrating an implementation of the third deployment methodology is shown according to an implementation of the disclosure. FIG. 6 illustrates a data flow 600 including receipt of user input to a network device, analysis of the user to automatically generate one or more search query statements, execution of an automatically generated search query statement, and return of results of the automatically generated search query statement. The data flow 600 begins when a user 602 provides user input 608 to a network device 604, where the user input 608 is a natural language description of a search query that the user desires to be translated into an executable search query statement and, optionally, executed thereafter. Upon receipt of the user input 608, the natural language description of a search query 610 is provided to query generation logic 130 of FIG. 1A (represented by the machine learning model icon 606), which analyzes the natural language description 610 using artificial intelligence as discussed above to return one or more executable search query statements 612.

Additional user input may then be received at the network device 604 indicating selection of one of the one or more automatically generated search query statements, with the selected search query statement then provided as a search query request 614A, 614B to a data intake and query system 620, optionally using a secure protocol 616 for transmission from the network device 604 to the data intake and query system 620. The data intake and query system 620 may be operating on a computing platform 618 such as cloud computing resources or enterprise resources. Results 622A, 622B may then be provided back to the network device 604 for display to the user, again, optionally, using the secure protocol 616 for transmission. It should be understood that the search query request 614A, 614B is the same request just prior to and following encryption. The same applies to the search results 622A, 622B.

Figure 7:
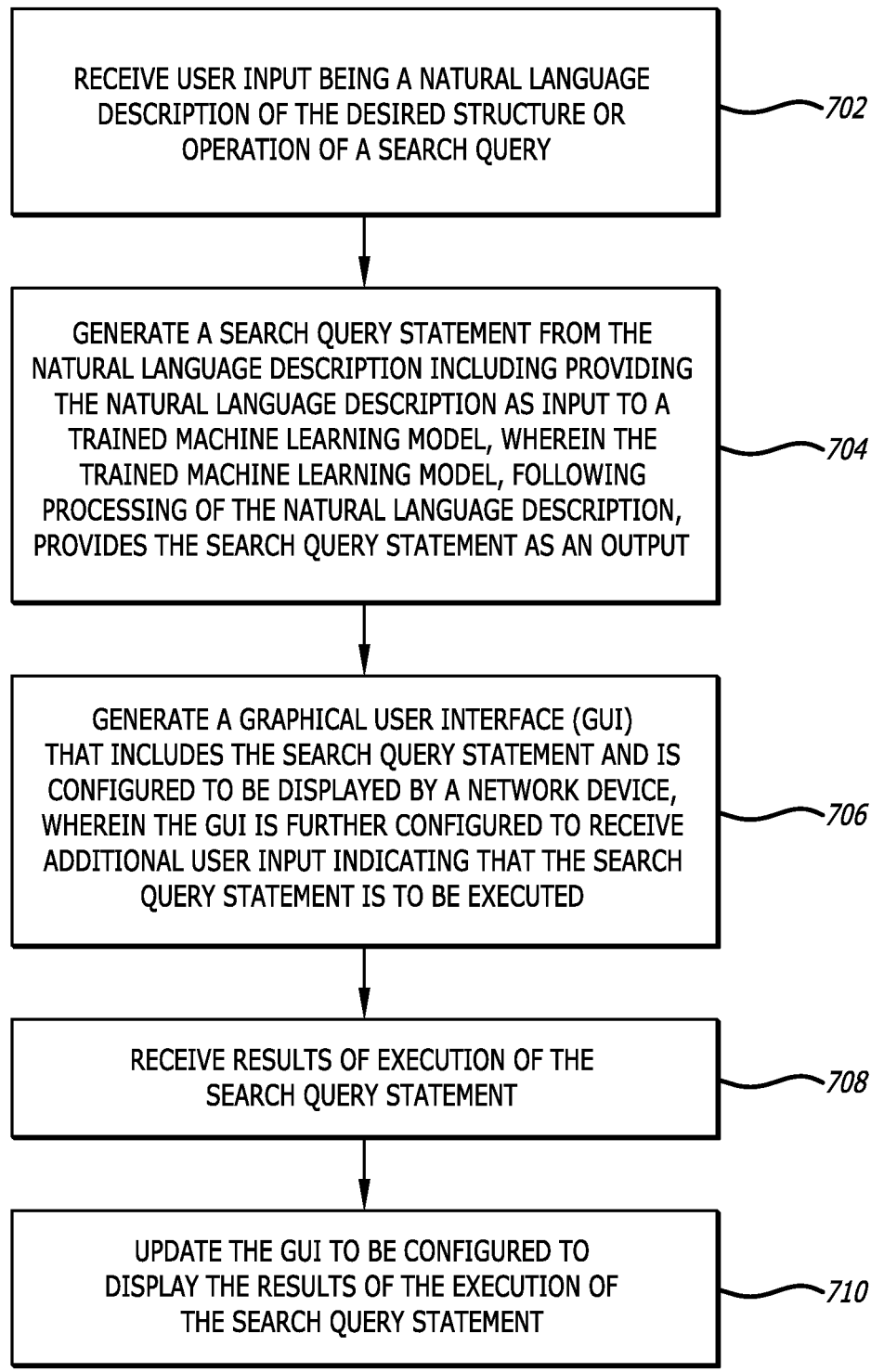
FIG. 7 is a flowchart illustrating an example process 700 of operations for performing automated generation of a search query through natural language translation using generative artificial intelligence techniques according to an implementation of the disclosure.

Referring now to FIG. 7, a flowchart illustrating an example process 700 of operations for performing automated generation of a search query through natural language translation using generative artificial intelligence techniques is shown according to an implementation of the disclosure. The example process 700 can be implemented, for example, by a computing device that comprises a processor and a non-transitory computer-readable medium. The non-transitory computer-readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, cause the one or more processors to perform the operations of the process 700 of FIG. 7.

Each block illustrated in FIG. 7 represents an operation in the process 700 performed by, for example, the query generation logic 130 of FIG. 1A. It should be understood that not every operation illustrated in FIG. 7 is required. In fact, certain operations may be optional to complete aspects of the process 700. The discussion of the operations of process 700 may be done so with reference to any of the previously described figures. The process 700 begins with an operation of receiving user input being a natural language description of the desired structure or operation of a search query statement (block 702). In some examples, the natural language description is derived from audible input that is translated via voice-to-text translation models and operations. Following receipt of the user input, the process 700 includes an operation of generating a search query statement from the natural language description including providing the natural language description as input to a trained machine learning model (block 704). In some instances, the trained machine learning model, following processing of the natural language description, provides the search query statement as an output. An additional operation of the process 700 includes generating a graphical user interface (GUI) including the search query statement configured to be displayed by a network device (block 706). In some examples, the GUI is configured to receive additional user input indicating the search query statement is to be executed. Following execution of the search query statement, the process 700 includes operations of receiving results of execution of the search query statement and updating the GUI to be configured to display the results of the execution of the search query statement (blocks 708-710).

In some examples, the results of the execution of the search query statement are received from a data intake and query system instance. An additional operation may include generating a plurality of search query statements, wherein the trained machine learning model, following processing of the natural language description, provides the output including the plurality of search query statements along with a prediction for each of the plurality of search query statements indicating a likelihood that each of the plurality of search query statements accurately represents the natural language description.

In some instances, the GUI includes: a first display section configured to receive initial user input selecting a storage location at which data to be queried is stored, a second display section configured to receive the user input being the natural language description, and a third display section configured to display the results of the execution of the search query statement. In some implementations, the GUI depicts a chatbox, and wherein the trained machine learning model is a generative pre-trained transformer trained to transform the natural language description to executable software code. In some instances, updating the GUI to be configured to display the results of the execution of the search query statement includes determining a graphical visualization for representing the results within the chatbox. The search query statement may be a pipelined search query statement that includes a sequence of commands formulated such that an order in which the sequence of commands is arranged defines an order in which the sequence of commands is applied to a set of data.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 8:
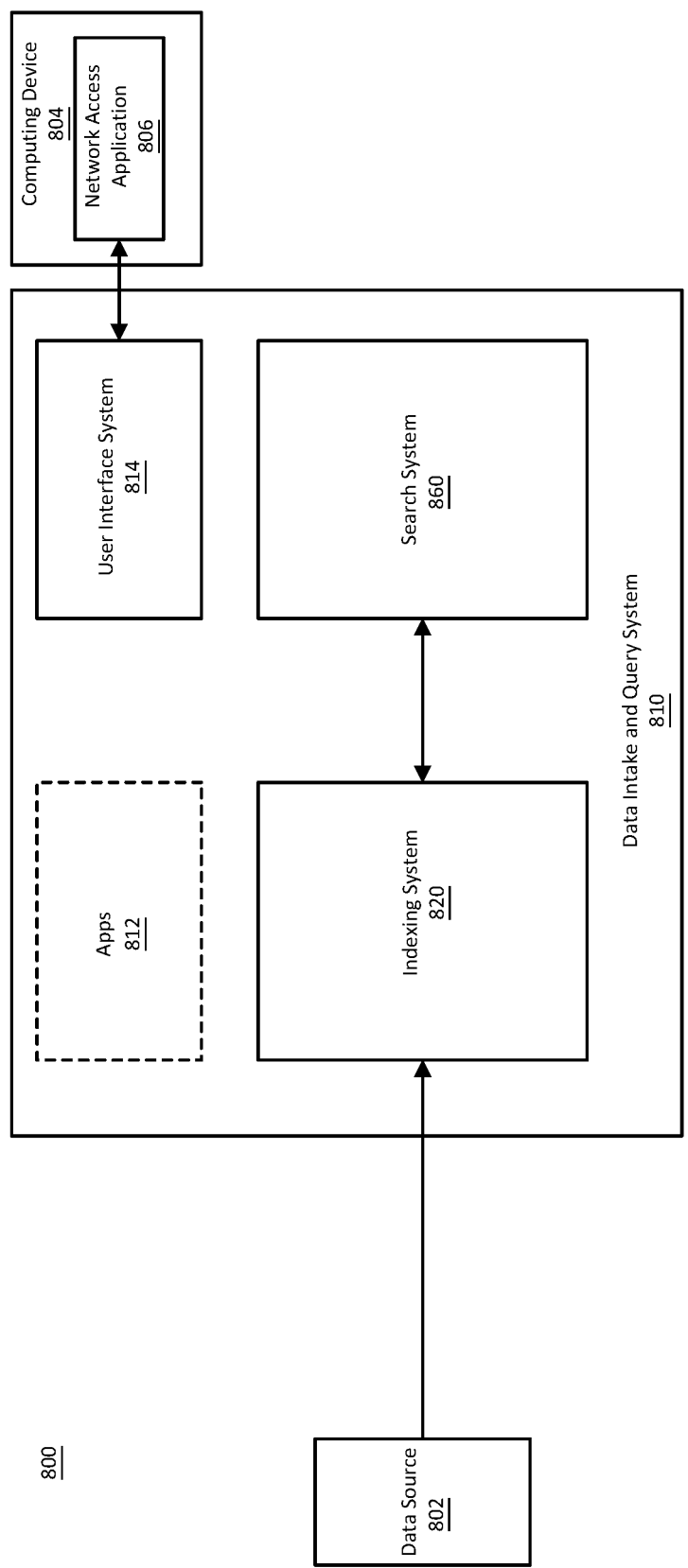
FIG. 8 is a block diagram illustrating an example computing environment that includes a data intake and query system according to an implementation of the disclosure.

FIG. 8 is a block diagram illustrating an example computing environment 800 that includes a data intake and query system 810. The data intake and query system 810 obtains data from a data source 802 in the computing environment 800, and ingests the data using an indexing system 820. A search system 860 of the data intake and query system 810 enables users to navigate the indexed data. Though drawn with separate boxes in FIG. 8, in some implementations the indexing system 820 and the search system 860 can have overlapping components. A computing device 804, running a network access application 806, can communicate with the data intake and query system 810 through a user interface system 814 of the data intake and query system 810. Using the computing device 804, a user can perform various operations with respect to the data intake and query system 810, such as administration of the data intake and query system 810, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 810 can further optionally include apps 812 that extend the search, analytics, and/or visualization capabilities of the data intake and query system 810.

The data intake and query system 810 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 810 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 810 can be executed on a single computing device, or execution of the program code can be distributed over multiple computing devices. For example, the program code can include instructions for both indexing and search components (which may be part of the indexing system 820 and/or the search system 860, respectively), which can be executed on a computing device that also provides the data source 802. As another example, the program code can be executed on one computing device, where execution of the program code provides both indexing and search components, while another copy of the program code executes on a second computing device that provides the data source 802. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 802 of the computing environment 800 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 802 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 820 obtains machine data from the data source 802 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 820 does not require prior knowledge of the structure of incoming data (e.g., the indexing system 820 does not need to be provided with a schema describing the data). Additionally, the indexing system 820 retains a copy of the data as it was received by the indexing system 820 such that the original data is always available for searching (e.g., no data is discarded, though, in some examples, the indexing system 820 can be configured to do so).

The search system 860 searches the data stored by the indexing 820 system. As discussed in greater detail below, the search system 860 enables users associated with the computing environment 800 (and possibly also other users) to navigate the data, generate reports, and visualize search results in "dashboards" output using a graphical interface. Using the facilities of the search system 860, users can obtain insights about the data, such as retrieving events from an index, calculating metrics, searching for specific conditions within a rolling time window, identifying patterns in the data, and predicting future trends, among other examples. To achieve greater efficiency, the search system 860 can apply map-reduce methods to parallelize searching of large volumes of data. Additionally, because the original data is available, the search system 860 can apply a schema to the data at search time. This allows different structures to be applied to the same data, or for the structure to be modified if or when the content of the data changes. Application of a schema at search time may be referred to herein as a late-binding schema technique.

The user interface system 814 provides mechanisms through which users associated with the computing environment 800 (and possibly others) can interact with the data intake and query system 810. These interactions can include configuration, administration, and management of the indexing system 820, initiation and/or scheduling of queries that are to be processed by the search system 860, receipt or reporting of search results, and/or visualization of search results. The user interface system 814 can include, for example, facilities to provide a command line interface or a web-based interface.

Users can access the user interface system 814 using a computing device 804 that communicates with data intake and query system 810, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 800. For example, a person can log in as a particular user and, using the user's digital information, can access the data intake and query system 810. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 804 can provide a human-machine interface through which a person can have a digital presence in the computing environment 800 in the form of a user. The computing device 804 is an electronic device having one or more processors and a memory capable of storing instructions for execution by the one or more processors. The computing device 804 can further include input/output (I/O) hardware and a network interface. Applications executed by the computing device 804 can include a network access application 806, such as a web browser, which can use a network interface of the client computing device 804 to communicate, over a network, with the user interface system 814 of the data intake and query system 810. The user interface system 814 can use the network access application 806 to generate user interfaces that enable a user to interact with the data intake and query system 810. A web browser is one example of a network access application. A shell tool can also be used as a network access application. In some examples, the data intake and query system 810 is an application executing on the computing device 806. In such examples, the network access application 806 can access the user interface system 814 without going over a network.

The data intake and query system 810 can optionally include apps 812. An app of the data intake and query system 810 is a collection of configurations, knowledge objects (a user-defined entity that enriches the data in the data intake and query system 810), views, and dashboards that may provide additional functionality, different techniques for searching the data, and/or additional insights into the data. The data intake and query system 810 can execute multiple applications simultaneously. Example applications include an information technology service intelligence application, which can monitor and analyze the performance and behavior of the computing environment 800, and an enterprise security application, which can include content and searches to assist security analysts in diagnosing and acting on anomalous or malicious behavior in the computing environment 800.

Though FIG. 8 illustrates only one data source, in practical implementations, the computing environment 800 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 800, the data intake and query system 810 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with the subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 800 can include on-prem and cloud-based computing resources, or only cloud-based resources. For example, an entity may have on-prem computing devices and a private cloud. In this example, the entity operates the data intake and query system 810 and can choose to execute the data intake and query system 810 on an on-prem computing device or in the cloud. In another example, a provider entity operates the data intake and query system 810 in a public cloud and provides the functionality of the data intake and query system 810 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 810. In some implementations, the entity providing the data intake and query system 810 is itself subscribing to the cloud services of a cloud service provider. As an example, a first entity provides computing resources under a public cloud service model, a second entity subscribes to the cloud services of the first provider entity and uses the cloud computing resources to operate the data intake and query system 810, and a third entity can subscribe to the services of the second provider entity in order to use the functionality of the data intake and query system 810. In this example, the data sources are associated with the third entity, users accessing the data intake and query system 810 are associated with the third entity, and the analytics and insights provided by the data intake and query system 810 are for purposes of the third entity's operations.

Figure 9:
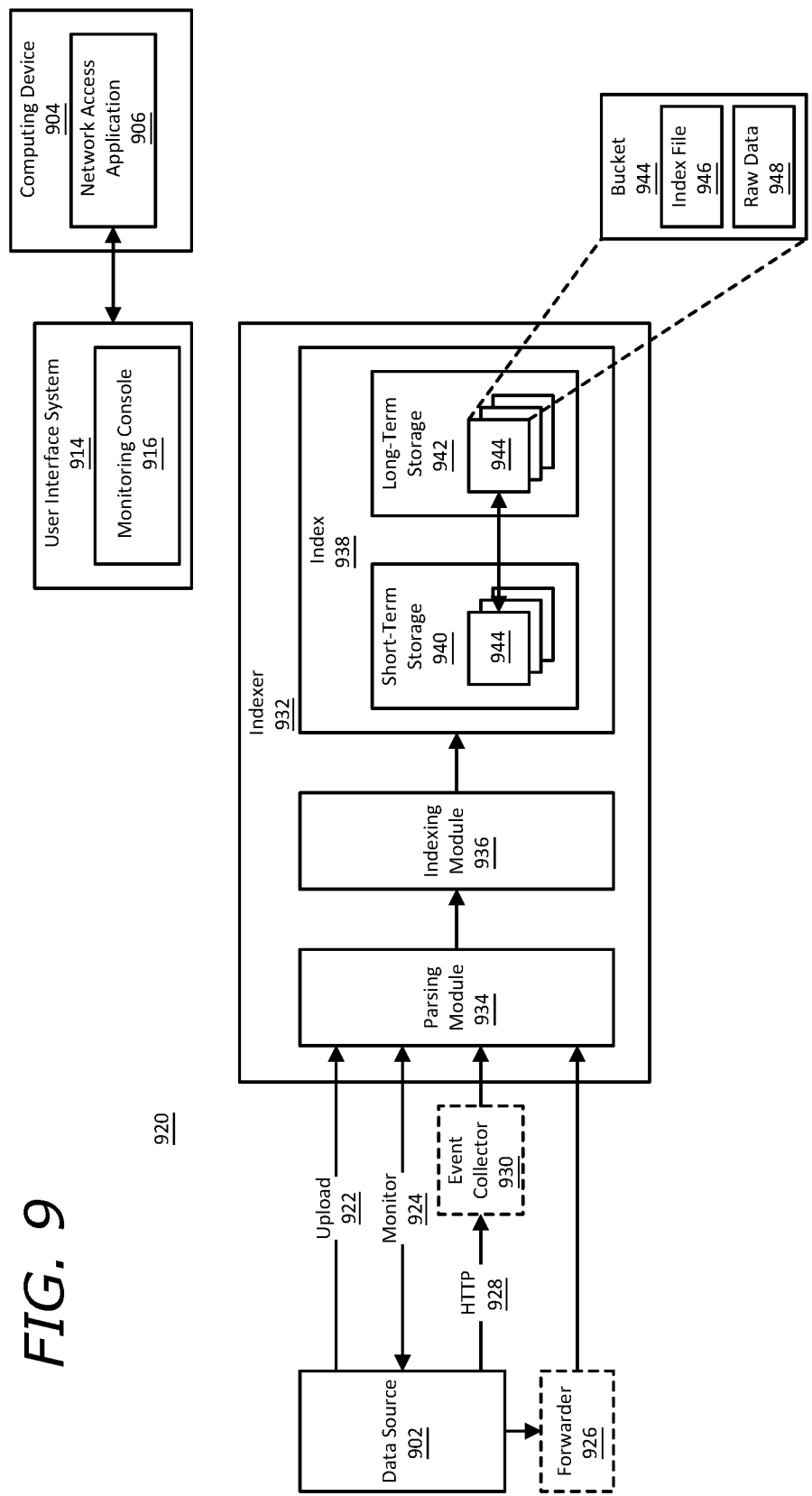
FIG. 9 is a block diagram illustrating in greater detail an example of an indexing system of a data intake and query system, such as the data intake and query system of FIG. 8 according to an implementation of the disclosure.

FIG. 9 is a block diagram illustrating in greater detail an example of an indexing system 920 of a data intake and query system, such as the data intake and query system 810 of FIG. 8. The indexing system 920 of FIG. 9 uses various methods to obtain machine data from a data source 902 and stores the data in an index 938 of an indexer 932. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 920 enables the data intake and query system to obtain the machine data produced by the data source 902 and to store the data for searching and retrieval.

Users can administer the operations of the indexing system 920 using a computing device 904 that can access the indexing system 920 through a user interface system 914 of the data intake and query system. For example, the computing device 904 can be executing a network access application 906, such as a web browser or a terminal, through which a user can access a monitoring console 916 provided by the user interface system 914. The monitoring console 916 can enable operations such as: identifying the data source 902 for data ingestion; configuring the indexer 932 to index the data from the data source 932; configuring a data ingestion method; configuring, deploying, and managing clusters of indexers; and viewing the topology and performance of a deployment of the data intake and query system, among other operations. The operations performed by the indexing system 920 may be referred to as "index time" operations, which are distinct from "search time" operations that are discussed further below.

The indexer 932, which may be referred to herein as a data indexing component, coordinates and performs most of the index time operations. The indexer 932 can be implemented using program code that can be executed on a computing device. The program code for the indexer 932 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 932. In some implementations, the indexer 932 executes on the computing device 904 through which a user can access the indexing system 920. In some implementations, the indexer 932 executes on a different computing device than the illustrated computing device 904.

The indexer 932 may be executing on the computing device that also provides the data source 902 or may be executing on a different computing device. In implementations wherein the indexer 932 is on the same computing device as the data source 902, the data produced by the data source 902 may be referred to as "local data." In other implementations the data source 902 is a component of a first computing device and the indexer 932 executes on a second computing device that is different from the first computing device. In these implementations, the data produced by the data source 902 may be referred to as "remote data." In some implementations, the first computing device is "on-prem" and in some implementations the first computing device is "in the cloud." In some implementations, the indexer 932 executes on a computing device in the cloud and the operations of the indexer 932 are provided as a service to entities that subscribe to the services provided by the data intake and query system.

For a given data produced by the data source 902, the indexing system 920 can be configured to use one of several methods to ingest the data into the indexer 932. These methods include upload 922, monitor 924, using a forwarder 926, or using HyperText Transfer Protocol (HTTP 928) and an event collector 930. These and other methods for data ingestion may be referred to as "getting data in" (GDI) methods.

Using the upload 922 method, a user can specify a file for uploading into the indexer 932. For example, the monitoring console 916 can include commands or an interface through which the user can specify where the file is located (e.g., on which computing device and/or in which directory of a file system) and the name of the file. The file may be located at the data source 902 or maybe on the computing device where the indexer 932 is executing. Once uploading is initiated, the indexer 932 processes the file, as discussed further below. Uploading is a manual process and occurs when instigated by a user. For automated data ingestion, the other ingestion methods are used.

The monitor 924 method enables the indexing system 902 to monitor the data source 902 and continuously or periodically obtain data produced by the data source 902 for ingestion by the indexer 932. For example, using the monitoring console 916, a user can specify a file or directory for monitoring. In this example, the indexing system 902 can execute a monitoring process that detects whenever the file or directory is modified and causes the file or directory contents to be sent to the indexer 932. As another example, a user can specify a network port for monitoring. In this example, a monitoring process can capture data received at or transmitting from the network port and cause the data to be sent to the indexer 932. In various examples, monitoring can also be configured for data sources such as operating system event logs, performance data generated by an operating system, operating system registries, operating system directory services, and other data sources.

Monitoring is available when the data source 902 is local to the indexer 932 (e.g., the data source 902 is on the computing device where the indexer 932 is executing). Other data ingestion methods, including forwarding and the event collector 930, can be used for either local or remote data sources.

A forwarder 926, which may be referred to herein as a data forwarding component, is a software process that sends data from the data source 902 to the indexer 932. The forwarder 926 can be implemented using program code that can be executed on the computer device that provides the data source 902. A user launches the program code for the forwarder 926 on the computing device that provides the data source 902. The user can further configure the forwarder 926, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 926 can provide various capabilities. For example, the forwarder 926 can send the data unprocessed or can perform minimal processing on the data before sending the data to the indexer 932. Minimal processing can include, for example, adding metadata tags to the data to identify a source, source type, and/or host, among other information, dividing the data into blocks, and/or applying a timestamp to the data. In some implementations, the forwarder 926 can break the data into individual events (event generation is discussed further below) and send the events to a receiver. Other operations that the forwarder 926 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 930 provides an alternate method for obtaining data from the data source 902. The event collector 930 enables data and application events to be sent to the indexer 932 using HTTP 928. The event collector 930 can be implemented using program code that can be executed on a computing device. The program code may be a component of the data intake and query system or can be a standalone component that can be executed independently of the data intake and query system and operates in cooperation with the data intake and query system.

To use the event collector 930, a user can, for example using the monitoring console 916 or a similar interface provided by the user interface system 914, enable the event collector 930 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 902 as an alternative method to using a username and password for authentication.

To send data to the event collector 930, the data source 902 is supplied with a token and can then send HTTP 928 requests to the event collector 930. To send HTTP 928 requests, the data source 902 can be configured to use an HTTP client and/or to use logging libraries such as those supplied by Java, JavaScript, and NET libraries. An HTTP client enables the data source 902 to send data to the event collector 930 by supplying the data, and a Uniform Resource Identifier (URI) for the event collector 930 to the HTTP client. The HTTP client then handles establishing a connection with the event collector 930, transmitting a request containing the data, closing the connection, and receiving an acknowledgment if the event collector 930 sends one. Logging libraries enable HTTP 928 requests to the event collector 930 to be generated directly by the data source. For example, an application can include or link a logging library, and through functionality provided by the logging library manage establishing a connection with the event collector 930, transmitting a request, and receiving an acknowledgement.

An HTTP 928 request to the event collector 930 can contain a token, a channel identifier, event metadata, and/or event data. The token authenticates the request with the event collector 930. The channel identifier, if available in the indexing system 920, enables the event collector 930 to segregate and keep separate data from different data sources. The event metadata can include one or more key-value pairs that describe the data source 902 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 930 extracts events from HTTP 928 requests and sends the events to the indexer 932. The event collector 930 can further be configured to send events to one or more indexers. Extracting the events can include associating any metadata in a request with the event or events included in the request. In these implementations, event generation by the indexer 932 (discussed further below) is bypassed, and the indexer 932 moves the events directly to indexing. In some implementations, the event collector 930 extracts event data from a request and outputs the event data to the indexer 932, and the indexer generates events from the event data. In some implementations, the event collector 930 sends an acknowledgement message to the data source 902 to indicate that the event collector 930 has received a particular request form the data source 902, and/or to indicate to the data source 902 that events in the request have been added to an index.

The indexer 932 ingests incoming data and transforms the data into searchable knowledge in the form of events. In the data intake and query system, an event is a single piece of data that represents activity of the component represented in FIG. 9 by the data source 902. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 932 can include a parsing module 934 and an indexing module 936 for generating and storing the events. The parsing module 934 and indexing module 936 can be modular and pipelined, such that one component can be operating on a first set of data while the second component is simultaneously operating on a second sent of data. Additionally, the indexer 932 may at any time have multiple instances of the parsing module 934 and indexing module 936, with each set of instances configured to simultaneously operate on data from the same data source or from different data sources. The parsing module 934 and indexing module 936 are illustrated in FIG. 9 to facilitate discussion, with the understanding that implementations with other components are possible to achieve the same functionality.

The parsing module 934 determines information about incoming event data, where the information can be used to identify events within the event data. For example, the parsing module 934 can associate a source type with the event data. A source type identifies the data source 902 and describes a possible data structure of event data produced by the data source 902. For example, the source type can indicate which fields to expect in events generated at the data source 902 and the keys for the values in the fields, and possibly other information such as sizes of fields, an order of the fields, a field separator, and so on. The source type of the data source 902 can be specified when the data source 902 is configured as a source of event data. Alternatively, the parsing module 934 can determine the source type from the event data, for example from an event field in the event data or using machine learning techniques applied to the event data.

Other information that the parsing module 934 can determine includes timestamps. In some cases, an event includes a timestamp as a field, and the timestamp indicates a point in time when the action represented by the event occurred or was recorded by the data source 902 as event data. In these cases, the parsing module 934 may be able to determine from the source type associated with the event data that the timestamps can be extracted from the events themselves. In some cases, an event does not include a timestamp and the parsing module 934 determines a timestamp for the event, for example from a name associated with the event data from the data source 902 (e.g., a file name when the event data is in the form of a file) or a time associated with the event data (e.g., a file modification time). As another example, when the parsing module 934 is not able to determine a timestamp from the event data, the parsing module 934 may use the time at which it is indexing the event data. As another example, the parsing module 934 can use a user-configured rule to determine the timestamps to associate with events.

The parsing module 934 can further determine event boundaries. In some cases, a single line (e.g., a sequence of characters ending with a line termination) in event data represents one event while in other cases, a single line represents multiple events. In yet other cases, one event may span multiple lines within the event data. The parsing module 934 may be able to determine event boundaries from the source type associated with the event data, for example from a data structure indicated by the source type. In some implementations, a user can configure rules the parsing module 934 can use to identify event boundaries.

The parsing module 934 can further extract data from events and possibly also perform transformations on the events. For example, the parsing module 934 can extract a set of fields (key-value pairs) for each event, such as a host or hostname, source or source name, and/or source type. The parsing module 934 may extract certain fields by default or based on a user configuration. Alternatively or additionally, the parsing module 934 may add fields to events, such as a source type or a user-configured field. As another example of a transformation, the parsing module 934 can anonymize fields in events to mask sensitive information, such as social security numbers or account numbers. Anonymizing fields can include changing or replacing values of specific fields. The parsing component 934 can further perform user-configured transformations.

The parsing module 934 outputs the results of processing incoming event data to the indexing module 936, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 932 can be configured to identify searchable segments that are parts of fields, searchable segments that are entire fields, or both. The parsing module 934 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 946, to find event data that matches a search query. In some implementations, segmentation can alternatively be performed by the forwarder 926. Segmentation can also be disabled, in which case the indexer 932 will not build a lexicon for the event data. When segmentation is disabled, the search system searches the event data directly.

Building index data structures generates the index 938. The index 938 is a storage data structure on a storage device (e.g., a disk drive or other physical device for storing digital data). The storage device may be a component of the computing device on which the indexer 932 is operating (referred to herein as local storage) or may be a component of a different computing device (referred to herein as remote storage) that the indexer 938 has access to over a network. The indexer 932 can manage more than one index and can manage indexes of different types. For example, the indexer 932 can manage event indexes, which impose minimal structure on stored data and can accommodate any type of data. As another example, the indexer 932 can manage metrics indexes, which use a highly structured format to handle the higher volume and lower latency demands associated with metrics data.

The indexing module 936 organizes files in the index 938 in directories referred to as buckets. The files in a bucket 944 can include raw data files, index files, and possibly also other metadata files. As used herein, "raw data" means data as when the data was produced by the data source 902, without alteration to the format or content. As noted previously, the parsing component 934 may add fields to event data and/or perform transformations on fields in the event data. Event data that has been altered in this way is referred to herein as enriched data. A raw data file 948 can include enriched data, in addition to or instead of raw data. The raw data file 948 may be compressed to reduce disk usage. An index file 946, which may also be referred to herein as a "time-series index" or tsidx file, contains metadata that the indexer 932 can use to search a corresponding raw data file 948. As noted above, the metadata in the index file 946 includes a lexicon of the event data, which associates each unique keyword in the event data with a reference to the location of event data within the raw data file 948. The keyword data in the index file 946 may also be referred to as an inverted index. In various implementations, the data intake and query system can use index files for other purposes, such as to store data summarizations that can be used to accelerate searches.

A bucket 944 includes event data for a particular range of time. The indexing module 936 arranges buckets in the index 938 according to the age of the buckets, such that buckets for more recent ranges of time are stored in short-term storage 940 and buckets for less recent ranges of time are stored in long-term storage 942. Short-term storage 940 may be faster to access while long-term storage 942 may be slower to access. Buckets may be moves from short-term storage 940 to long-term storage 942 according to a configurable data retention policy, which can indicate at what point in time a bucket is old enough to be moved.

A bucket's location in short-term storage 940 or long-term storage 942 can also be indicated by the bucket's status. As an example, a bucket's status can be "hot," "warm," "cold," "frozen," or "thawed." In this example, hot bucket is one to which the indexer 932 is writing data and the bucket becomes a warm bucket when the index 932 stops writing data to it. In this example, both hot and warm buckets reside in short-term storage 940. Continuing this example, when a warm bucket is moved to long-term storage 942, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 920 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 920 through the monitoring console 916 provided by the user interface system 914. Using the monitoring console 916, the user can configure and monitor an index cluster, and see information such as disk usage by an index, volume usage by an indexer, index and volume size over time, data age, statistics for bucket types, and bucket settings, among other information.

Figure 10:
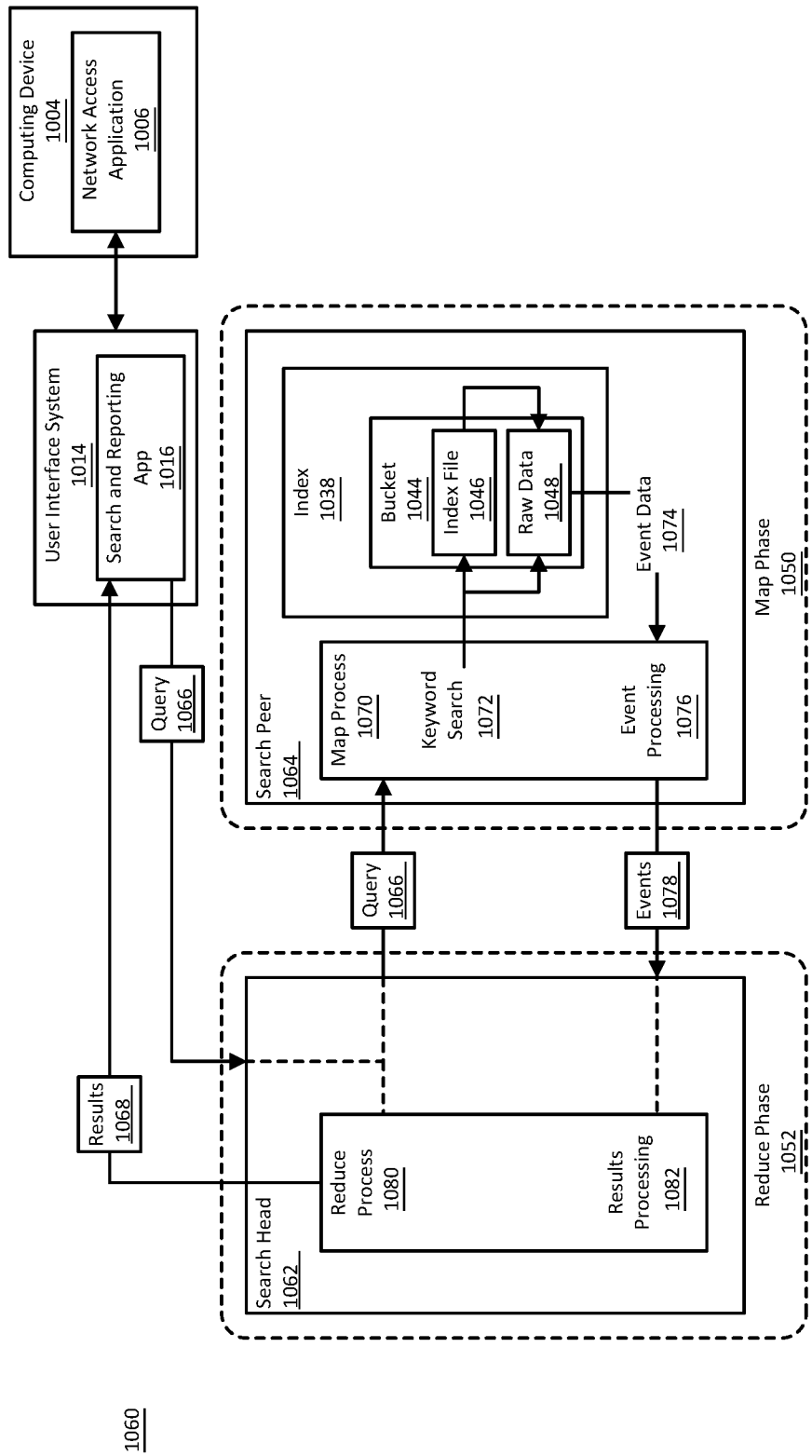
FIG. 10 is a block diagram illustrating in greater detail an example of the search system of a data intake and query system, such as the data intake and query system of FIG. 8 according to an implementation of the disclosure.

FIG. 10 is a block diagram illustrating in greater detail an example of the search system 1060 of a data intake and query system, such as the data intake and query system 810 of FIG. 8. The search system 1060 of FIG. 10 issues a query 1066 to a search head 1062, which sends the query 1066 to a search peer 1064. Using a map process 1070, the search peer 1064 searches the appropriate index 1038 for events identified by the query 1066 and sends events 1078 so identified back to the search head 1062. Using a reduce process 1082, the search head 1062 processes the events 1078 and produces results 1068 to respond to the query 1066. The results 1068 can provide useful insights about the data stored in the index 1038. These insights can aid in the administration of information technology systems, in security analysis of information technology systems, and/or in analysis of the development environment provided by information technology systems.

The query 1066 that initiates a search is produced by a search and reporting app 1016 that is available through the user interface system 1014 of the data intake and query system. Using a network access application 1006 executing on a computing device 1004, a user can input the query 1066 into a search field provided by the search and reporting app 1016. Alternatively or additionally, the search and reporting app 1016 can include pre-configured queries or stored queries that can be activated by the user. In some cases, the search and reporting app 1016 initiates the query 1066 when the user enters the query 1066. In these cases, the query 1066 maybe referred to as an "ad-hoc" query. In some cases, the search and reporting app 1016 initiates the query 1066 based on a schedule. For example, the search and reporting app 1016 can be configured to execute the query 1066 once per hour, once per day, at a specific time, on a specific date, or at some other time that can be specified by a date, time, and/or frequency. These types of queries maybe referred to as scheduled queries.

The query 1066 is specified using a search processing language. The search processing language includes commands or search terms that the search peer 1064 will use to identify events to return in the search results 1068. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1066 to include sequential commands, where a subsequent command may operate on the results of a prior command. As an example, sequential commands may be separated in the query 1066 by a vertical line ("|" or "pipe") symbol.

In addition to one or more search commands, the query 1066 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1066 occurs in two broad phases: a map phase 1050 and a reduce phase 1052. The map phase 1050 takes place across one or more search peers. In the map phase 1050, the search peers locate event data that matches the search terms in the search query 1066 and sorts the event data into field-value pairs. When the map phase 1050 is complete, the search peers send events that they have found to one or more search heads for the reduce phase

1052. During the reduce phase 1052, the search heads process the events through commands in the search query 1066 and aggregate the events to produce the final search results 1068.

A search head, such as the search head 1062 illustrated in FIG. 10, is a component of the search system 1060 that manages searches. The search head 1062, which may also be referred to herein as a search management component, can be implemented using program code that can be executed on a computing device. The program code for the search head 1062 can be stored on a non-transitory computer-readable medium and from this medium can be loaded or copied to the memory of a computing device. One or more hardware processors of the computing device can read the program code from the memory and execute the program code in order to implement the operations of the search head 1062.

Upon receiving the search query 1066, the search head 1062 directs the query 1066 to one or more search peers, such as the search peer 1064 illustrated in FIG. 10. "Search peer" is an alternate name for "indexer" and a search peer may be largely similar to the indexer described previously. The search peer 1064 may be referred to as a "peer node" when the search peer 1064 is part of an indexer cluster. The search peer 1064, which may also be referred to as a search execution component, can be implemented using program code that can be executed on a computing device. In some implementations, one set of program code implements both the search head 1062 and the search peer 1064 such that the search head 1062 and the search peer 1064 form one component. In some implementations, the search head 1062 is an independent piece of code that performs searching and no indexing functionality. In these implementations, the search head 1062 may be referred to as a dedicated search head.

The search head 1062 may consider multiple criteria when determining whether to send the query 1066 to the particular search peer 1064. For example, the search system 1060 may be configured to include multiple search peers that each have duplicative copies of at least some of the event data and are implanted using different hardware resources q. In this example, the sending the search query 1066 to more than one search peer allows the search system 1060 to distribute the search workload across different hardware resources. As another example, search system 1060 may include different search peers for different purposes (e.g., one has an index storing a first type of data or from a first data source while a second has an index storing a second type of data or from a second data source). In this example, the search query 1066 may specify which indexes to search, and the search head 1062 will send the query 1066 to the search peers that have those indexes.

To identify events 1078 to send back to the search head 1062, the search peer 1064 performs a map process 1070 to obtain event data 1074 from the index 1038 that is maintained by the search peer 1064. During a first phase of the map process 1070, the search peer 1064 identifies buckets that have events that are described by the time indicator in the search query 1066. As noted above, a bucket contains events whose timestamps fall within a particular range of time. For each bucket 1044 whose events can be described by the time indicator, during a second phase of the map process 1070, the search peer 1064 performs a keyword search 1074 using search terms specified in the search query 1066. The search terms can be one or more of keywords, phrases, fields, Boolean expressions, and/or comparison expressions that in combination describe events being searched for. When segmentation is enabled at index time, the search peer 1064 performs the keyword search 1072 on the bucket's index file 1046. As noted previously, the index file 1046 includes a lexicon of the searchable terms in the events stored in the bucket's raw data 1048 file. The keyword search 1072 searches the lexicon for searchable terms that correspond to one or more of the search terms in the query 1066. As also noted above, the lexicon includes, for each searchable term, a reference to each location in the raw data 1048 file where the searchable term can be found. Thus, when the keyword search identifies a searchable term in the index file 1046 that matches a search term in the query 1066, the search peer 1064 can use the location references to extract from the raw data 1048 file the event data 1074 for each event that include the searchable term.

In cases where segmentation was disabled at index time, the search peer 1064 performs the keyword search 1072 directly on the raw data 1048 file. To search the raw data 1048, the search peer 1064 may identify searchable segments in events in a similar manner as when the data was indexed. Thus, depending on how the search peer 1064 is configured, the search peer 1064 may look at event fields and/or parts of event fields to determine whether an event matches the query 1066. Any matching events can be added to the event data 1074 read from the raw data 1048 file. The search peer 1064 can further be configured to enable segmentation at search time, so that searching of the index 1038 causes the search peer 1064 to build a lexicon in the index file 1046.

The event data 1074 obtained from the raw data 1048 file includes the full text of each event found by the keyword search 1072. During a third phase of the map process 1070, the search peer 1064 performs event processing 1076 on the event data 1074, with the steps performed being determined by the configuration of the search peer 1064 and/or commands in the search query 1066. For example, the search peer 1064 can be configured to perform field discovery and field extraction. Field discovery is a process by which the search peer 1064 identifies and extracts key-value pairs from the events in the event data 1074. The search peer 1064 can, for example, be configured to automatically extract the first 100 fields (or another number of fields) in the event data 1074 that can be identified as key-value pairs. As another example, the search peer 1064 can extract any fields explicitly mentioned in the search query 1066. The search peer 1064 can, alternatively or additionally, be configured with particular field extractions to perform.

Other examples of steps that can be performed during event processing 1076 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1064 sends processed events 1078 to the search head 1062, which performs a reduce process 1080. The reduce process 1080 potentially receives events from multiple search peers and performs various results processing 1082 steps on the received events. The results processing 1082 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1082 can further include applying commands from the search query 1066 to the events. The query 1066 can include, for example, commands for evaluating and/or manipulating fields (e.g., to generate new fields from existing fields or parse fields that have more than one value). As another example, the query 1066 can include commands for calculating statistics over the events, such as counts of the occurrences of fields, or sums, averages, ranges, and so on, of field values. As another example, the query 1066 can include commands for generating statistical values for purposes of generating charts of graphs of the events.

The reduce process 1080 outputs the events found by the search query 1066, as well as information about the events. The search head 1062 transmits the events and the information about the events as search results 1068, which are received by the search and reporting app 1016. The search and reporting app 1016 can generate visual interfaces for viewing the search results 1068. The search and reporting app 1016 can, for example, output visual interfaces for the network access application 1006 running on a computing device 1004 to generate.

The visual interfaces can include various visualizations of the search results 1068, such as tables, line or area charts, Chloropleth maps, or single values. The search and reporting app 1016 can organize the visualizations into a dashboard, where the dashboard includes a panel for each visualization. A dashboard can thus include, for example, a panel listing the raw event data for the events in the search results 1068, a panel listing fields extracted at index time and/or found through field discovery along with statistics for those fields, and/or a timeline chart indicating how many events occurred at specific points in time (as indicated by the timestamps associated with each event). In various implementations, the search and reporting app 1016 can provide one or more default dashboards. Alternatively or additionally, the search and reporting app 1016 can include functionality that enables a user to configure custom dashboards.

The search and reporting app 1016 can also enable further investigation into the events in the search results 1016. The process of further investigation may be referred to as drilldown. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1066. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 11:
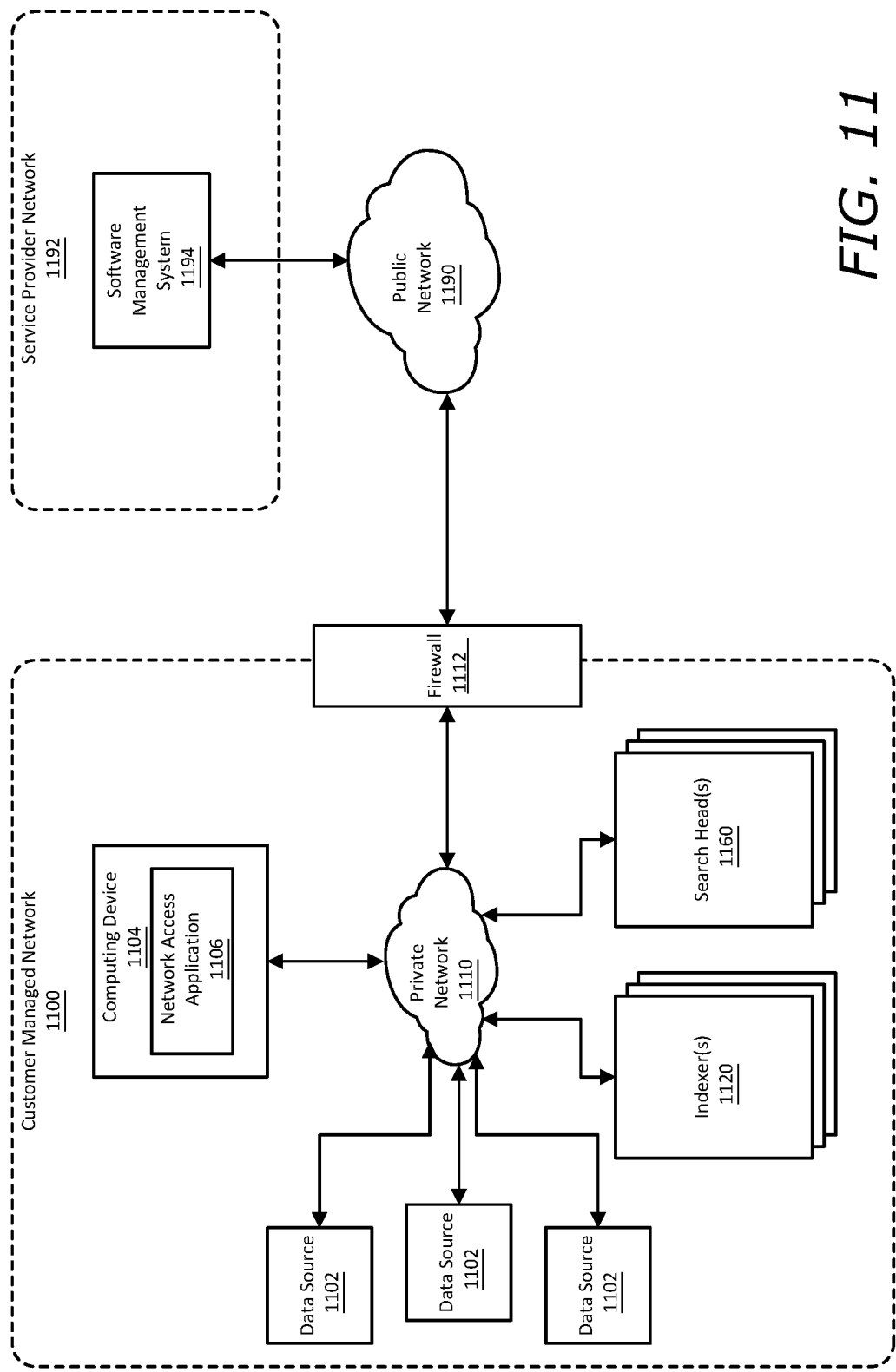
FIG. 11 illustrates an example of a self-managed network 1100 that includes a data intake and query system according to an implementation of the disclosure.

FIG. 11 illustrates an example of a self-managed network 1100 that includes a data intake and query system. "Self-managed" in this instance means that the entity that is operating the self-managed network 1100 configures, administers, maintains, and/or operates the data intake and query system using its own compute resources and people. Further, the self-managed network 1100 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1100 is located within the customer's on-prem environment, such as in the entity's data center, the operation and management of the self-managed network 1100, including of the resources in the self-managed network 1100, is under the control of the entity. For example, administrative personnel of the entity have complete access to and control over the configuration, management, and security of the self-managed network 1100 and its resources.

The self-managed network 1100 can execute one or more instances of the data intake and query system. An instance of the data intake and query system may be executed by one or more computing devices that are part of the self-managed network 1100. A data intake and query system instance can comprise an indexing system and a search system, where the indexing system includes one or more indexers 1120 and the search system includes one or more search heads 1160.

As depicted in FIG. 11, the self-managed network 1100 can include one or more data sources 1102. Data received from these data sources may be processed by an instance of the data intake and query system within self-managed network 1100. The data sources 1102 and the data intake and query system instance can be communicatively coupled to each other via a private network 1110.

Users associated with the entity can interact with and avail themselves of the functions performed by a data intake and query system instance using computing devices. As depicted in FIG. 11, a computing device 1104 can execute a network access application 1106 (e.g., a web browser), that can communicate with the data intake and query system instance and with data sources 1102 via the private network 1110. Using the computing device 1104, a user can perform various operations with respect to the data intake and query system, such as management and administration of the data intake and query system, generation of knowledge objects, and other functions. Results generated from processing performed by the data intake and query system instance may be communicated to the computing device 1104 and output to the user via an output system (e.g., a screen) of the computing device 1104.

The self-managed network 1100 can also be connected to other networks that are outside the entity's on-premise environment/network, such as networks outside the entity's data center. Connectivity to these other external networks is controlled and regulated through one or more layers of security provided by the self-managed network 1100. One or more of these security layers can be implemented using firewalls 1112. The firewalls 1112 form a layer of security around the self-managed network 1100 and regulate the transmission of traffic from the self-managed network 1100 to the other networks and from these other networks to the self-managed network 1100.

Networks external to the self-managed network can include various types of networks including public networks 1190, other private networks, and/or cloud networks provided by one or more cloud service providers. An example of a public network 1190 is the Internet. In the example depicted in FIG. 11, the self-managed network 1100 is connected to a service provider network 1192 provided by a cloud service provider via the public network 1190.

In some implementations, resources provided by a cloud service provider may be used to facilitate the configuration and management of resources within the self-managed network 1100. For example, configuration and management of a data intake and query system instance in the self-managed network 1100 may be facilitated by a software management system 1194 operating in the service provider network 1192.

There are various ways in which the software management system 1194 can facilitate the configuration and management of a data intake and query system instance within the self-managed network 1100. As one example, the software management system 1194 may facilitate the download of software including software updates for the data intake and query system. In this example, the software management system 1194 may store information indicative of the versions of the various data intake and query system instances present in the self-managed network 1100. When a software patch or upgrade is available for an instance, the software management system 1194 may inform the self-managed network 1100 of the patch or upgrade. This can be done via messages communicated from the software management system 1194 to the self-managed network 1100.

The software management system 1194 may also provide simplified ways for the patches and/or upgrades to be downloaded and applied to the self-managed network 1100. For example, a message communicated from the software management system 1194 to the self-managed network 1100 regarding a software upgrade may include a Uniform Resource Identifier (URI) that can be used by a system administrator of the self-managed network 1100 to download the upgrade to the self-managed network 1100. In this manner, management resources provided by a cloud service provider using the service provider network 1192 and which are located outside the self-managed network 1100 can be used to facilitate the configuration and management of one or more resources within the entity's on-prem environment. In some implementations, the download of the upgrades and patches may be automated, whereby the software management system 1194 is authorized to, upon determining that a patch is applicable to a data intake and query system instance inside the self-managed network 1100, automatically communicate the upgrade or patch to self-managed network 1100 and cause it to be installed within self-managed network 1100.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   receiving user input being a natural language description of a search query;
   generating at least a first executable search query statement from the natural language description including providing the natural language description as input to a trained machine learning model, wherein the trained machine learning model, following processing of the natural language description, provides the first executable search query statement as an output and the first executable search query statement includes a sequence of commands formulated in which an order of the sequence of commands defines an order in which the sequence of commands is applied to a set of data of the user input and each command of the sequence of commands operates on results of a prior command of the sequence of commands;
   generating and displaying (i) a graphical user interface (GUI) including the first executable search query statement and (ii) a display element that, upon selection, causes execution of the first executable search query statement;

receiving results of execution of the first executable search query statement;

displaying the results of execution of the first executable search query statement as a graphical visualization within the GUI; and updating the GUI configured to display the results of the execution of the first executable search query statement thereby updating the graphical visualization after selection of the display element.

2. The computer-implemented method of claim 1, wherein the results of the execution of the first executable search query statement are received from a data intake and query system instance.

3. The computer-implemented method of claim 1, wherein the generating of at least the first executable search query statement comprises generating a plurality of search query statements including the first executable search query statement, wherein the trained machine learning model, following processing of the natural language description, provides the output including the plurality of search query statements along with a prediction for each of the plurality of search query statements indicating a likelihood that each of the plurality of search query statements accurately represents the natural language description.

4. The computer-implemented method of claim 1, wherein the GUI includes:
a first display section configured to receive initial user input selecting a storage location at which data to be queried is stored,
a second display section configured to receive the user input being the natural language description, and
a third display section configured to display the results of the execution of the first executable search query statement.

5. The computer-implemented method of claim 1, wherein the trained machine learning model is a generative pre-trained transformer trained to transform the natural language description to executable software code and the GUI corresponds to a chatbox.

6. The computer-implemented method of claim 5, wherein the updating of the GUI includes determining a graphical visualization for representing the results within the chatbox.

7. The computer-implemented method of claim 1, wherein prior to generating and displaying the results of the graphical user interface (GUI) including the first executable search query statement, the method further comprising:
selecting the first executable search query statement from a plurality of search query statements.

8. A computing device, comprising:
a processor; and
a non-transitory computer-readable medium having stored thereon instructions that, when executed by the processor, cause the processor to perform operations including:
receiving user input being a natural language description of a search query;
generating at least a first executable search query statement from the natural language description including providing the natural language description as input to a trained machine learning model, wherein the trained machine learning model, following processing of the natural language description, provides the first executable search query statement as an output and the first executable search query statement includes a sequence of commands formulated in which an order of the sequence of commands defines an order in which the sequence of commands is applied to a set of data of the user input and each command of the sequence of commands operates on results of a prior command of the sequence of commands;

generating and displaying (i) a graphical user interface (GUI) including the first executable search query statement and (ii) a display element that, upon selection, causes execution of the first executable search query statement;

receiving results of execution of the first executable search query statement;

displaying the results of execution of the first executable search query statement as a graphical visualization within the GUI; and updating the GUI configured to display the results of the execution of the first executable search query statement thereby updating the graphical visualization after selection of the display element.

9. The computing device of claim 8, wherein the results of the execution of the first executable search query statement are received from a data intake and query system instance.

10. The computing device of claim 8, wherein the generating of the first executable search query statement comprises generating a plurality of search query statements including the first executable search query statement, wherein the trained machine learning model, following processing of the natural language description, provides the output including the plurality of search query statements along with a prediction for each of the plurality of search query statements indicating a likelihood that each of the plurality of search query statements accurately represents the natural language description.

11. The computing device of claim 8, wherein the GUI includes:
a first display section configured to receive initial user input selecting a storage location at which data to be queried is stored,
a second display section configured to receive the user input being the natural language description, and
a third display section configured to display the results of the execution of the first executable search query statement.

12. The computing device of claim 8, wherein the trained machine learning model is a generative pre-trained transformer trained to transform the natural language description to executable software code and the GUI corresponds to a chatbox.

13. The computing device of claim 12, wherein the updating of the GUI includes determining a graphical visualization for representing the results within the chatbox.

14. A non-transitory computer-readable medium having stored thereon instructions that, when executed by one or more processors, cause the one or more processor to perform operations including:
receiving user input being a natural language description of a search query;
generating at least a first executable search query statement from the natural language description including providing the natural language description as input to a trained machine learning model, wherein the trained machine learning model, following processing of the natural language description, provides the first executable search query statement as an output and the first executable search query statement includes a sequence of commands formulated in which an order of the sequence of commands defines an order in which the sequence of commands is applied to a set of data of the user input and each command of the sequence of commands operates on results of a prior command of the sequence of commands;

generating and displaying (i) a graphical user interface (GUI) including the first executable search query statement and (ii) a display element that, upon selection, causes execution of the first executable search query statement;

receiving the results of execution of the first executable search query statement; and displaying the results of execution of the first executable search query statement as a graphical visualization within the GUI; and updating the GUI configured to display the results of the execution of the first executable search query statement thereby updating the graphical visualization after selection of the display element.

15. The non-transitory computer-readable medium of claim 14, wherein the results of the execution of the first executable search query statement as an updated graphical visualization are received from a data intake and query system instance.

16. The non-transitory computer-readable medium of claim 14, wherein the generating of the first executable search query statement comprises generating a plurality of search query statements including the first executable search query statement, wherein the trained machine learning model, following processing of the natural language description, provides the output including the plurality of search query statements along with a prediction for each of the plurality of search query statements indicating a likelihood that each of the plurality of search query statements accurately represents the natural language description;

the generating of the executable search query statement comprises generating a plurality of search query statements including the first executable search query statement, wherein the trained machine learning model, following processing of the natural language description, provides the output including the plurality of search query statements along with a prediction for each of the plurality of search query statements indicating a likelihood that each of the plurality of search query statements accurately represents the natural language description.

17. The non-transitory computer-readable medium of claim 14, wherein the GUI includes:

a first display section configured to receive initial user input selecting a storage location at which data to be queried is stored, a second display section configured to receive the user input being the natural language description, and a third display section configured to display the results of the execution of the first executable search query statement.

18. The non-transitory computer-readable medium of claim 14, wherein the trained machine learning model is a generative pre-trained transformer trained to transform the natural language description to executable software code, and wherein updating the GUI includes determining a graphical visualization for representing the results within a chatbox corresponding to the GUI.

* * * * *